US009804771B2

(12) United States Patent
Migos et al.

(10) Patent No.: US 9,804,771 B2
(45) Date of Patent: Oct. 31, 2017

(54) DEVICE, METHOD, AND COMPUTER READABLE MEDIUM FOR ESTABLISHING AN IMPROMPTU NETWORK

(75) Inventors: Charles J. Migos, San Bruno, CA (US); Jay Christopher Capela, Santa Cruz, CA (US); Markus Hagele, San Francisco, CA (US); Diego Bauducco, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1979 days.

(21) Appl. No.: 13/077,904

(22) Filed: Mar. 31, 2011

(65) Prior Publication Data

US 2012/0240042 A1    Sep. 20, 2012

Related U.S. Application Data

(60) Provisional application No. 61/452,619, filed on Mar. 14, 2011.

(51) Int. Cl.

| G06F 3/048 | (2013.01) |
|---|---|
| G06Q 30/02 | (2012.01) |
| G01C 21/20 | (2006.01) |
| G06F 1/16 | (2006.01) |
| H04W 84/20 | (2009.01) |
| H04W 12/04 | (2009.01) |
| G06F 3/0488 | (2013.01) |
| G06F 3/01 | (2006.01) |
| G06F 3/038 | (2013.01) |

(52) U.S. Cl.
CPC .......... *G06F 3/04883* (2013.01); *G06F 3/017* (2013.01); *G06F 3/038* (2013.01); *G06F 2203/0381* (2013.01)

(58) Field of Classification Search
CPC .. G06F 3/041; G06F 3/01; G06K 9/00; G09G 5/00; G06Q 30/02; H04L 12/58
USPC ................... 345/173, 156; 382/103; 715/702
See application file for complete search history.

(56) References Cited

U.S. PATENT DOCUMENTS

| 2008/0168403 | A1 | 7/2008 | Westerman | |
|---|---|---|---|---|
| 2009/0146962 | A1 | 6/2009 | Ahonen | |
| 2010/0027843 | A1* | 2/2010 | Wilson | 382/103 |
| 2012/0001856 | A1* | 1/2012 | Davidson | 345/173 |
| 2012/0154294 | A1 | 6/2012 | Hinckley | |
| 2012/0256866 | A1* | 10/2012 | Yu et al. | 345/173 |

* cited by examiner

*Primary Examiner* — Lin Li
(74) *Attorney, Agent, or Firm* — Blank Rome LLP

(57) ABSTRACT

An electronic device with a touch-sensitive surface and a device motion sensor detects a predefined gesture on the touch-sensitive surface. The predefined gesture has one or more gesture components. The device detects a predefined movement of the electronic device with the device motion sensor. The predefined movement has one or more movement components. In response to detecting the predefined gesture and the predefined movement, the device, in accordance with a determination that the one or more gesture components and the one or more movement components satisfy predefined concurrency criteria, performs a predefined operation that is associated with concurrent detection of the predefined gesture and the predefined movement, and in accordance with a determination that the one or more gesture components and the one or more movement components do not satisfy the predefined concurrency criteria, foregoes performing the predefined operation.

31 Claims, 19 Drawing Sheets

Figure 5C

Device 100-1 / Touch Screen 112-1

The nervous system is a complex network of nervous tissue that sends electrical and chemical signals. The nervous systems include the central nervous system (CNS) and the peripheral nervous system (PNS) together.

Central Nervous System

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

510
03/23/10 9:53am
A report is due 4/15/10.
We will have a quiz on 4/22/10.

Device 100-2 / Touch Screen 112-2

The nervous system is a complex network of nervous tissue that sends electrical and chemical signals. The nervous systems include the central nervous system (CNS) and the peripheral nervous system (PNS) together.

Central Nervous System

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

03/23/10 9:53am
A report is due 4/15/10.
We will have a quiz on 4/22/10.

600

602 Detect a predefined gesture on a touch-sensitive surface. The predefined gesture has one or more gesture components, and a respective gesture component occurs at a respective gesture component time.

604 The predefined gesture on the touch-sensitive surface is a gesture with a duration below a predefined duration threshold

606 Detect a predefined movement of an electronic device with a device motion sensor. The predefined movement has one or more movement components, and a respective movement component occurs at a respective movement component time.

608 The predefined movement of the electronic device is movement of the device that corresponds to an acceleration satisfying a predefined acceleration threshold

610 The predefined gesture includes multiple gesture components and the predefined movement includes a corresponding number of multiple movement components

612 The predetermined gesture and movement are consistent with inputs that would be detected in response to a hand knocking on the touch-sensitive surface (A)

Figure 6A

614 In response to detecting the predefined gesture and the predefined movement:

616 In accordance with a determination that the one or more gesture components and the one or more movement components satisfy predefined concurrency criteria, perform a predefined operation that is associated with concurrent detection of the predefined gesture and the predefined movement

618 A first gesture component of the predefined gesture is detected at a first gesture time. A second gesture component of the predefined gesture is detected at a second gesture time. A first movement component of the predefined movement is detected at a first movement time. A second movement component of the predefined movement is detected at a second movement time. The one or more gesture components and the one or more movement components are determined to satisfy the predefined concurrency criteria only if: an amount of time between the first gesture time and the first movement time is less than a first concurrency threshold, and an amount of time between the second gesture time and the second movement time is less than a second concurrency threshold.

620 The concurrency threshold is less than 0.1 seconds

622 The predefined operation is a networking operation

624 The predefined operation is a networking operation with other devices within a limited network range of the electronic device

626 Receive data indicating that one or more other devices in the limited network range have detected a similar combination of predefined gesture and predefined motion. In response to receiving the data, establish a network connection with the one or more other devices.

628 In accordance with a determination that the one or more gesture components and the one or more movement components do not satisfy the predefined concurrency criteria, forego performing the predefined operation

702 Receive a network-initiation input from a user

704 The network-initiation input comprises a predefined network-initiation gesture that includes a gesture component detected on a touch-sensitive surface of an electronic device

706 The network-initiation gesture is not associated with any user interface element displayed on a display of the electronic device

708 In response to receiving the network-initiation input from the user, open a network connection time window for establishing one or more network connections with a plurality of candidate devices within a predefined network range of the electronic device. The network connection time window has a predefined expiration time.

710 The plurality of candidate devices within the predefined network range includes only devices connected to a same subnet as the electronic device

712 The plurality of candidate devices within the predefined network range includes only devices connected to a predefined set of one or more network routers

714 The plurality of candidate devices includes only devices in a predefined group of authorized devices within the predefined network range

716 The plurality of candidate devices includes only devices with a predefined software application (B)

Figure 7A

718. Receive, while the network connection time window is open, one or more respective requests to form a network connection sent from one or more respective responding devices in the plurality of candidate devices within the predefined network range 720. The respective responding device requests to form a network connection in response to detecting a network-response input from a respective user of the respective responding device 722. The network-response input is a predefined network-response gesture that includes a gesture component detected on a touch-sensitive surface of the respective responding device 724. The predefined network-response gesture is not associated with any user interface element displayed on a display of the respective responding device 726. The network-initiation input is a predefined network-initiation gesture, and the network-response gesture is a same type of gesture as the network-initiation gesture.

728. The network-initiation input is a predefined network-initiation gesture, and the network-response gesture is distinct from the network-initiation gesture.

730. While the network connection time window is open and prior to detecting the network-response input on a touch-sensitive surface of the respective responding device, the respective responding device does not display any visual indication that a network connection may be established with the electronic device.

732. While the network connection time window is open, monitor the plurality of candidate devices for communications indicating that one or more of the candidate devices have detected a network-response input. Receiving a respective request to form a network connection includes detecting a communication from a respective responding device indicating that the respective responding device has detected a respective network-response input at the respective responding device.

Figure 7B

718. Receive, while the network connection time window is open, one or more respective requests to form a network connection sent from one or more respective responding devices in the plurality of candidate devices within the predefined network range 734. After receiving the network-initiation input from the user, send an invitation to the plurality of candidate devices. The invitation has a predefined expiration time. Receiving a respective request to form a network connection includes receiving a respective response to the invitation from a respective responding device prior to the predefined expiration time of the invitation. The respective response is generated in response to detecting a respective network-response input at the respective responding device.

736. In response to receiving a respective request from a respective responding device within the predefined network range while the network connection time window is open, establish a respective network connection with the respective responding device 738. The one or more network connections enable the devices to share data between a plurality of different applications on the electronic device and corresponding applications on one or more respective connected responding devices 740. The one or more network connections are limited to sharing information in a predefined software application that is running on one or more respective connected responding devices 742. The one or more network connections are used to synchronize content displayed in the predefined software application on the electronic device with content displayed in the predefined software application on one or more respective connected responding devices 744. The one or more network connections are used to share content that is specific to the predefined software application between the electronic device and one or more respective connected responding devices

Figure 7C

746 A user interface that was displayed on the display of the electronic device prior to receiving the network-initiation input continues to be displayed on the display of the electronic device at least until the respective network connection is established 748 Requests to form a network connection are received from two or more respective responding devices of the plurality of candidate devices within the predefined network range, and network connections are established between the electronic device and the two or more respective responding devices.

750 One of the network connections enables the two or more respective responding devices to communicate with each other.

752 After the predefined expiration time of the network connection time window: receive a request from a respective candidate device of the plurality of candidate devices in the predefined network range to form a network connection with the electronic device, and prevent a network connection from being established between the electronic device and the respective candidate device.

Figure 7D

DEVICE, METHOD, AND COMPUTER READABLE MEDIUM FOR ESTABLISHING AN IMPROMPTU NETWORK

RELATED APPLICATIONS

This application claims priority to U.S. Provisional Application Ser. No. 61/452,619, filed Mar. 14, 2011, entitled "Device, Method, and Graphical User Interface for Establishing an Impromptu Network," which is incorporated by reference herein in its entirety.

This application is related to U.S. application Ser. No. 13/077,892, filed Mar. 31, 2011, entitled "Device, Method, and Computer Readable Medium for Detecting Concurrent Gestures and Device Movement," which is incorporated by reference herein in its entirety.

TECHNICAL FIELD

This relates generally to electronic devices with touch-sensitive surfaces, including but not limited to electronic devices with touch-sensitive surfaces that establish impromptu networks with other electronic devices.

BACKGROUND

The use of networked electronic devices has increased significantly in recent years. For mobile computing, exemplary networked devices include smart phones, tablets, notebooks, game machines, and other portable electronic devices. Such devices often communicate with one another using a wireless communication protocol, such as the Wi-Fi protocol or the Bluetooth protocol. Such network communications typically require a user to provide a series of inputs to establish a secure network. For example, the user may need to type in login information, such as a user name, network name, and a network password. The process of setting up a network can be confusing, time-consuming and cumbersome, particularly for inexperienced users. The complexity of this process can inhibit or prevent users from setting up impromptu local networks.

SUMMARY

Accordingly, there is a need for electronic devices with faster, more efficient methods and interfaces for establishing an impromptu network. Such methods and interfaces may complement or replace conventional methods for establishing networks. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a touch-sensitive surface and a device motion sensor configured to detect motion of the device. The method includes detecting a predefined gesture on the touch-sensitive surface. The predefined gesture has one or more gesture components, and a respective gesture component occurs at a respective gesture component time. The method also includes detecting a predefined movement of the electronic device with the device motion sensor. The predefined movement has one or more movement components, and a respective movement component occurs at a respective movement component time. The method includes, in response to detecting the predefined gesture and the predefined movement: in accordance with a determination that the one or more gesture components and the one or more movement components satisfy predefined concurrency criteria, performing a predefined operation that is associated with concurrent detection of the predefined gesture and the predefined movement, and in accordance with a determination that the one or more gesture components and the one or more movement components do not satisfy the predefined concurrency criteria, foregoing performing the predefined operation.

In accordance with some embodiments, an electronic device includes a touch-sensitive surface, a device motion sensor configured to detect motion of the device, one or more processors, memory, and one or more programs. The one or more programs are stored in the memory and configured to be executed by the one or more processors. The one or more programs include instructions for detecting a predefined gesture on the touch-sensitive surface. The predefined gesture has one or more gesture components, and a respective gesture component occurs at a respective gesture component time. The one or more programs also include instructions for detecting a predefined movement of the electronic device with the device motion sensor. The predefined movement has one or more movement components, and a respective movement component occurs at a respective movement component time. The one or more programs include instructions for, in response to detecting the predefined gesture and the predefined movement: in accordance with a determination that the one or more gesture components and the one or more movement components satisfy predefined concurrency criteria, performing a predefined operation that is associated with concurrent detection of the predefined gesture and the predefined movement, and in accordance with a determination that the one or more gesture components and the one or more movement components do not satisfy the predefined concurrency criteria, foregoing performing the predefined operation.

In accordance with some embodiments, a computer readable storage medium has stored therein instructions which when executed by an electronic device with a touch-sensitive surface and a device motion sensor configured to detect motion of the device, cause the device to detect a predefined gesture on the touch-sensitive surface. The predefined gesture has one or more gesture components, and a respective gesture component occurs at a respective gesture component time. The instructions also cause the device to detect a predefined movement of the electronic device with the device motion sensor. The predefined movement has one or more movement components, and a respective movement component occurs at a respective movement component time. The instructions cause the device to, in response to detecting the predefined gesture and the predefined movement: in accordance with a determination that the one or more gesture components and the one or more movement components satisfy predefined concurrency criteria, perform a predefined operation that is associated with concurrent detection of the predefined gesture and the predefined movement, and in accordance with a determination that the one or more gesture components and the one or more movement components do not satisfy the predefined concurrency criteria, forego performing the predefined operation.

In accordance with some embodiments, an electronic device includes: a touch-sensitive surface; a device motion sensor configured to detect motion of the device; and means for detecting a predefined gesture on the touch-sensitive surface. The predefined gesture has one or more gesture components, and a respective gesture component occurs at a respective gesture component time. The electronic device also includes means for detecting a predefined movement of the electronic device with the device motion sensor. The predefined movement has one or more movement components, and a respective movement component occurs at a respective movement component time. The electronic device includes means, enabled in response to detecting the predefined gesture and the predefined movement, including: means, enabled in accordance with a determination that the one or more gesture components and the one or more movement components satisfy predefined concurrency criteria, for performing a predefined operation that is associated with concurrent detection of the predefined gesture and the predefined movement, and means, enabled in accordance with a determination that the one or more gesture components and the one or more movement components do not satisfy the predefined concurrency criteria, for foregoing performing the predefined operation.

In accordance with some embodiments, an information processing apparatus for use in an electronic device with a touch-sensitive surface and a device motion sensor configured to detect motion of the device includes means for detecting a predefined gesture on the touch-sensitive surface. The predefined gesture has one or more gesture components, and a respective gesture component occurs at a respective gesture component time. The information processing apparatus includes means for detecting a predefined movement of the electronic device with the device motion sensor. The predefined movement has one or more movement components, and a respective movement component occurs at a respective movement component time. The information processing apparatus includes means, enabled in response to detecting the predefined gesture and the predefined movement, including: means, enabled in accordance with a determination that the one or more gesture components and the one or more movement components satisfy predefined concurrency criteria, for performing a predefined operation that is associated with concurrent detection of the predefined gesture and the predefined movement, and means, enabled in accordance with a determination that the one or more gesture components and the one or more movement components do not satisfy the predefined concurrency criteria, for foregoing performing the predefined operation.

In accordance with some embodiments, a method is performed at an electronic device with a display and a touch-sensitive surface. The method includes: receiving a network-initiation input from a user, and in response to receiving the network-initiation input from the user, opening a network connection time window for establishing one or more network connections with a plurality of candidate devices within a predefined network range of the electronic device. The network connection time window has a predefined expiration time. The method also includes receiving, while the network connection time window is open, one or more respective requests to form a network connection sent from one or more respective responding devices in the plurality of candidate devices within the predefined network range. The method includes, in response to receiving a respective request from a respective responding device within the predefined network range while the network connection time window is open, establishing a respective network connection with the respective responding device.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: receiving a network-initiation input from a user, and in response to receiving the network-initiation input from the user, opening a network connection time window for establishing one or more network connections with a plurality of candidate devices within a predefined network range of the electronic device. The network connection time window has a predefined expiration time. The one or more programs also include instructions for receiving, while the network connection time window is open, one or more respective requests to form a network connection sent from one or more respective responding devices in the plurality of candidate devices within the predefined network range. The one or more programs include instructions for, in response to receiving a respective request from a respective responding device within the predefined network range while the network connection time window is open, establishing a respective network connection with the respective responding device.

In accordance with some embodiments, a computer readable storage medium has stored therein instructions which when executed by an electronic device with a display and a touch-sensitive surface, cause the device to: receive a network-initiation input from a user, and in response to receiving the network-initiation input from the user, open a network connection time window for establishing one or more network connections with a plurality of candidate devices within a predefined network range of the electronic device. The network connection time window has a predefined expiration time. The instructions also cause the device to receive, while the network connection time window is open, one or more respective requests to form a network connection sent from one or more respective responding devices in the plurality of candidate devices within the predefined network range. The instructions cause the device to, in response to receiving a respective request from a respective responding device within the predefined network range while the network connection time window is open, establish a respective network connection with the respective responding device.

In accordance with some embodiments, an electronic device includes: a display; a touch-sensitive surface; means for receiving a network-initiation input from a user; and means, enabled in response to receiving the network-initiation input from the user, for opening a network connection time window for establishing one or more network connections with a plurality of candidate devices within a predefined network range of the electronic device. The network connection time window has a predefined expiration time. The electronic device also includes means for receiving, while the network connection time window is open, one or more respective requests to form a network connection sent from one or more respective responding devices in the plurality of candidate devices within the predefined network range. The electronic device includes means, enabled in response to receiving a respective request from a respective responding device within the predefined network range while the network connection time window is open, for establishing a respective network connection with the respective responding device.

In accordance with some embodiments, an information processing apparatus for use in an electronic device with a display and a touch-sensitive surface includes: means for receiving a network-initiation input from a user; and means, enabled in response to receiving the network-initiation input from the user, for opening a network connection time window for establishing one or more network connections with a plurality of candidate devices within a predefined network range of the electronic device. The network connection time window has a predefined expiration time. The information processing apparatus also includes means for receiving, while the network connection time window is open, one or more respective requests to form a network connection sent from one or more respective responding devices in the plurality of candidate devices within the predefined network range. The information processing apparatus includes means, enabled in response to receiving a respective request from a respective responding device within the predefined network range while the network connection time window is open, for establishing a respective network connection with the respective responding device.

In accordance with some embodiments, an electronic device includes: a device motion sensor unit configured to detect motion of the device, a touch-sensitive surface unit configured to receive user gestures, and a processing unit coupled to the device motion sensor unit and the touch-sensitive surface unit. The processing unit is configured to detect a predefined gesture on the touch-sensitive surface unit. The predefined gesture has one or more gesture components, and a respective gesture component occurs at a respective gesture component time. The processing unit is configured to detect a predefined movement of the electronic device with the device motion sensor unit. The predefined movement has one or more movement components, and a respective movement component occurs at a respective movement component time. The processing unit is configured to, in response to detecting the predefined gesture and the predefined movement: in accordance with a determination that the one or more gesture components and the one or more movement components satisfy predefined concurrency criteria, perform a predefined operation that is associated with concurrent detection of the predefined gesture and the predefined movement, and in accordance with a determination that the one or more gesture components and the one or more movement components do not satisfy the predefined concurrency criteria, forego performing the predefined operation.

In accordance with some embodiments, an electronic device includes: a display unit configured to display a user interface, a touch-sensitive surface unit configured to receive a network-initiation input from a user, and a processing unit coupled to the display unit and the touch-sensitive surface unit. The processing unit is configured to: receive a network-initiation input from a user, and in response to receiving the network-initiation input from the user, open a network connection time window for establishing one or more network connections with a plurality of candidate devices within a predefined network range of the electronic device. The network connection time window has a predefined expiration time. The processing unit is configured to receive, while the network connection time window is open, one or more respective requests to form a network connection sent from one or more respective responding devices in the plurality of candidate devices within the predefined network range. The processing unit is configured to, in response to receiving a respective request from a respective responding device within the predefined network range while the network connection time window is open, establish a respective network connection with the respective responding device.

Thus, electronic devices with touch-sensitive surfaces are provided with faster, more efficient methods and interfaces for establishing impromptu networks, thereby increasing the effectiveness, efficiency, and user satisfaction with such devices. Such methods and interfaces may complement or replace conventional methods for establishing networks.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 5A-5E illustrate exemplary user interfaces that are displayed while establishing an impromptu network in accordance with some embodiments.

FIGS. 6A-6B are flow diagrams illustrating a method of performing a predefined operation in response to detecting concurrent inputs in accordance with some embodiments.

FIGS. 7A-7D are flow diagrams illustrating a method of establishing an impromptu network in accordance with some embodiments.

DESCRIPTION OF EMBODIMENTS

Described below are methods and device that allow users to easily form an impromptu local network. For example, consider the scenario where a teacher is using an electronic textbook on the teacher's portable computer (e.g., a tablet computer) to teach a group of students in a classroom, with the students each having their own copy of the electronic textbook on their own portable computers. To establish an impromptu network between the teacher's computer and the students' computers, the teacher performs an input that opens a network connection time window. In some embodiments, the input may be as simple as a "knock-knock" gesture on a touch-sensitive surface of the teacher's portable computer. A network connection is formed between the teacher's computer and any of the students' computers that send a request to form a network with the teacher's computer while the network connection time window is open. In some embodiments, a student computer's request to form a network is sent in response to receiving a simple input from the student, such as a corresponding "knock" or "knock-knock" gesture on a touch-sensitive surface of the student's portable computer. For security, the network connection time window is only open for a brief time (e.g., less than 10 seconds) and only devices that lie within a predefined network range of the teacher's computer are able to network with the teacher's computer. In this scenario, from the perspective of the teacher and students, the establishment of a local impromptu network may be as simple as the teacher "knocking" on his computer and the students "knocking" on their computers in return to join the local impromptu network.

Gestures such as the "knock-knock" gesture may be reliably identified by detecting the gesture on a touch-sensitive surface while concurrently detecting movement of the electronic device with motion sensors. Requiring that device movement be detected concurrently with the gesture on the touch-sensitive surface leads to a more accurate determination of the gesture. For example, a "knock-knock" gesture on a touch-sensitive surface is more likely to be correctly interpreted as such if concurrent device motion is detected with the knuckles contacting the touch-sensitive surface, rather than just analyzing the contacts on the touch-sensitive surface to interpret the gesture. Note that the "knock-knock" gesture is merely exemplary of the gestures that may be more accurately interpreted by requiring that there be concurrent detection of device movement with the gesture on the touch-sensitive surface. In addition, note that initiating an impromptu network is merely exemplary of the operations that may be performed in response to detecting such gestures.

Figure 1A:
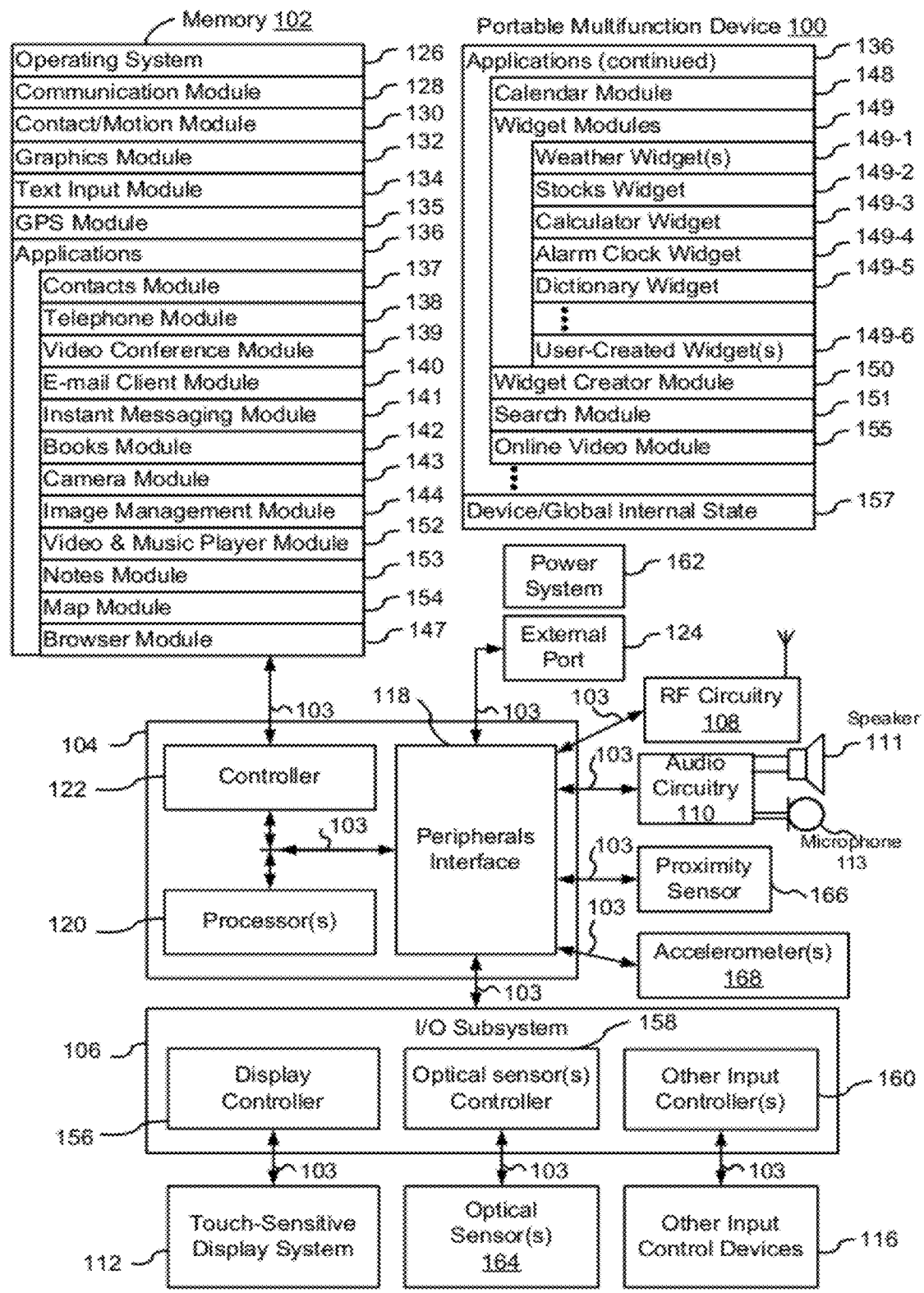
FIG. 1A is a block diagram illustrating a portable multifunction device with a touch-sensitive display in accordance with some embodiments.
Figure 1B:
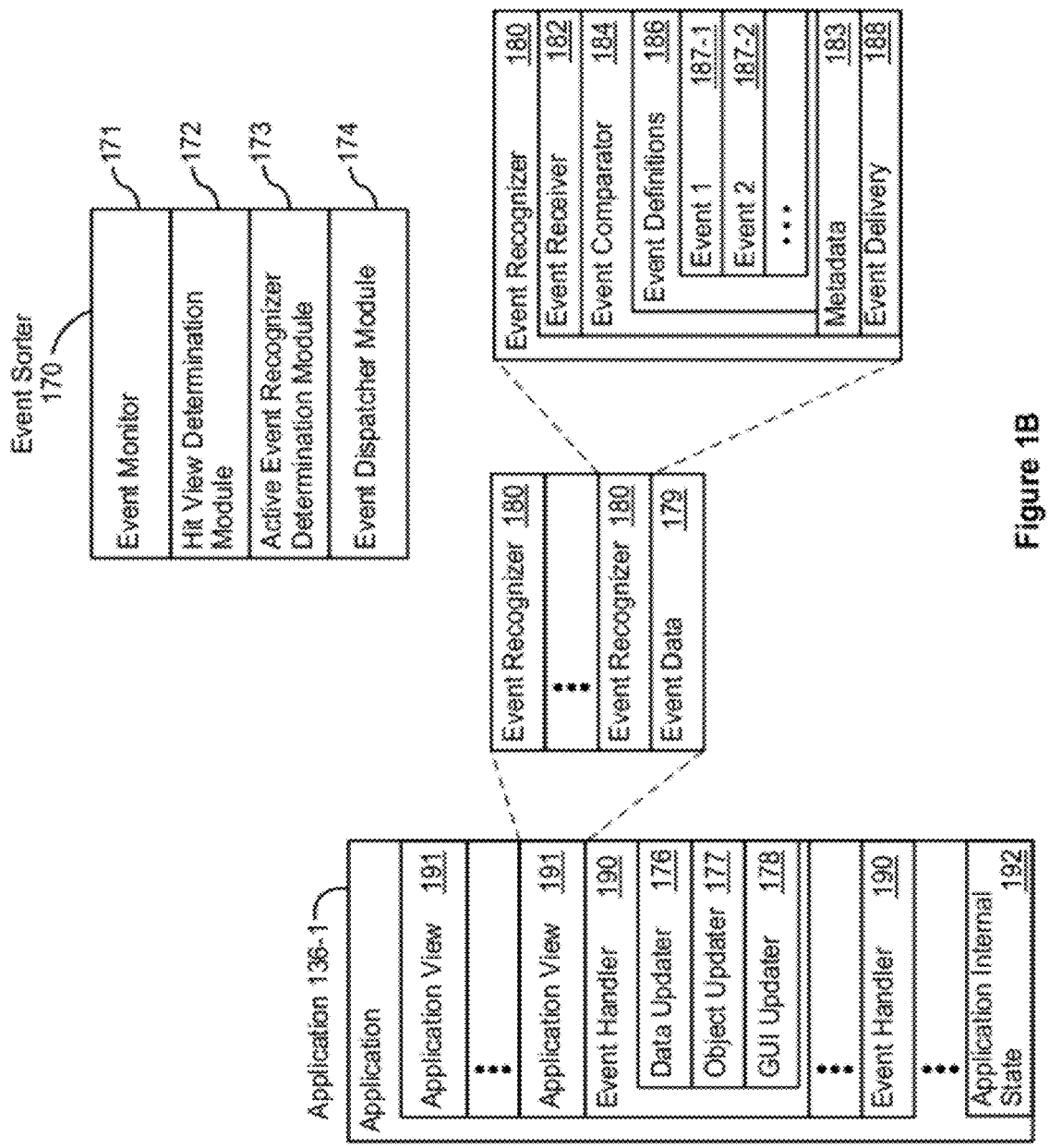
FIG. 1B is a block diagram illustrating exemplary components for event handling in accordance with some embodiments.
Figure 2:
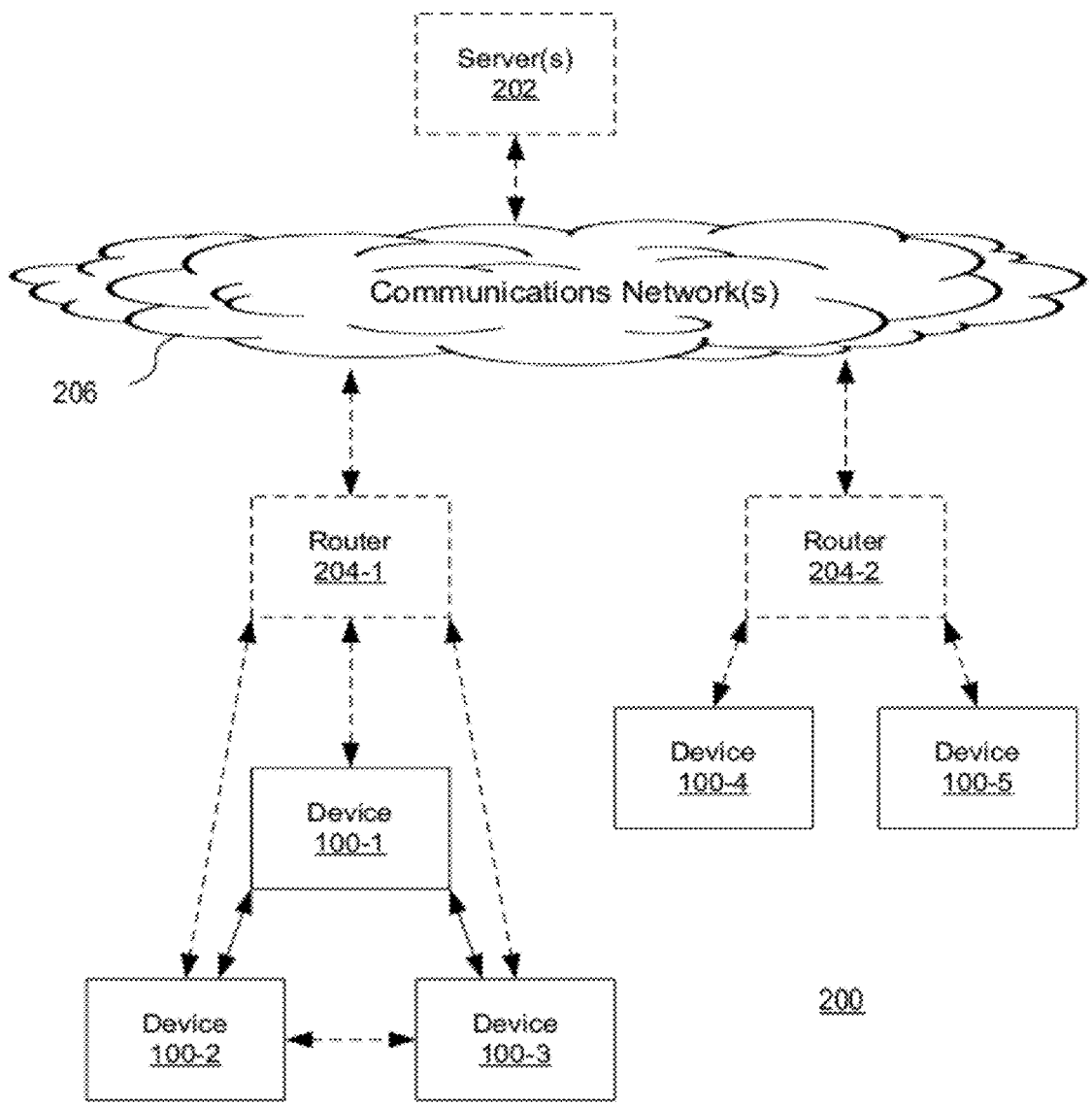
FIG. 2 is a block diagram illustrating an exemplary distributed computer system, in accordance with some embodiments.
Figure 3:
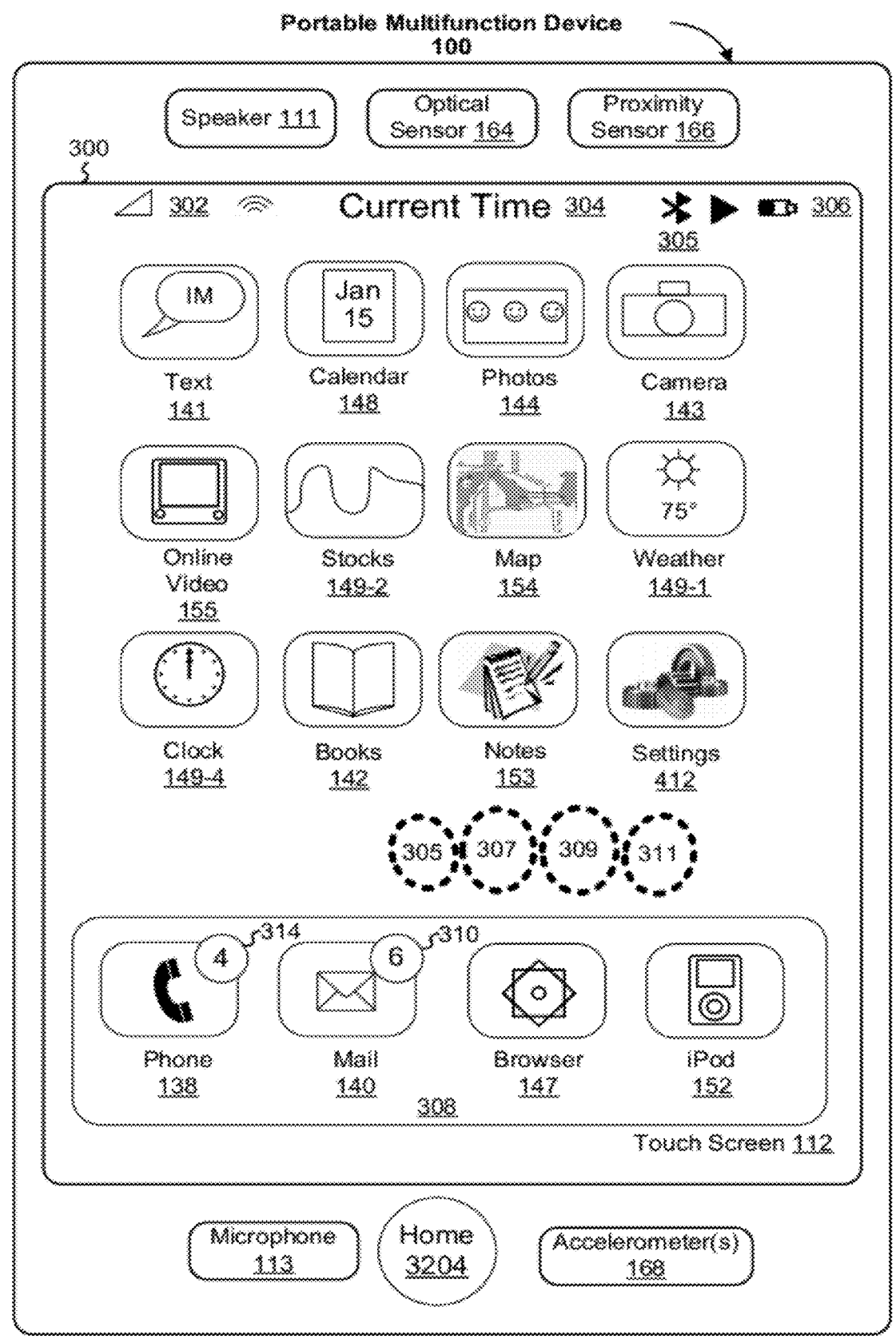
FIG. 3 illustrates an exemplary user interface for a menu of applications on a portable multifunction device in accordance with some embodiments.
Figure 4A:
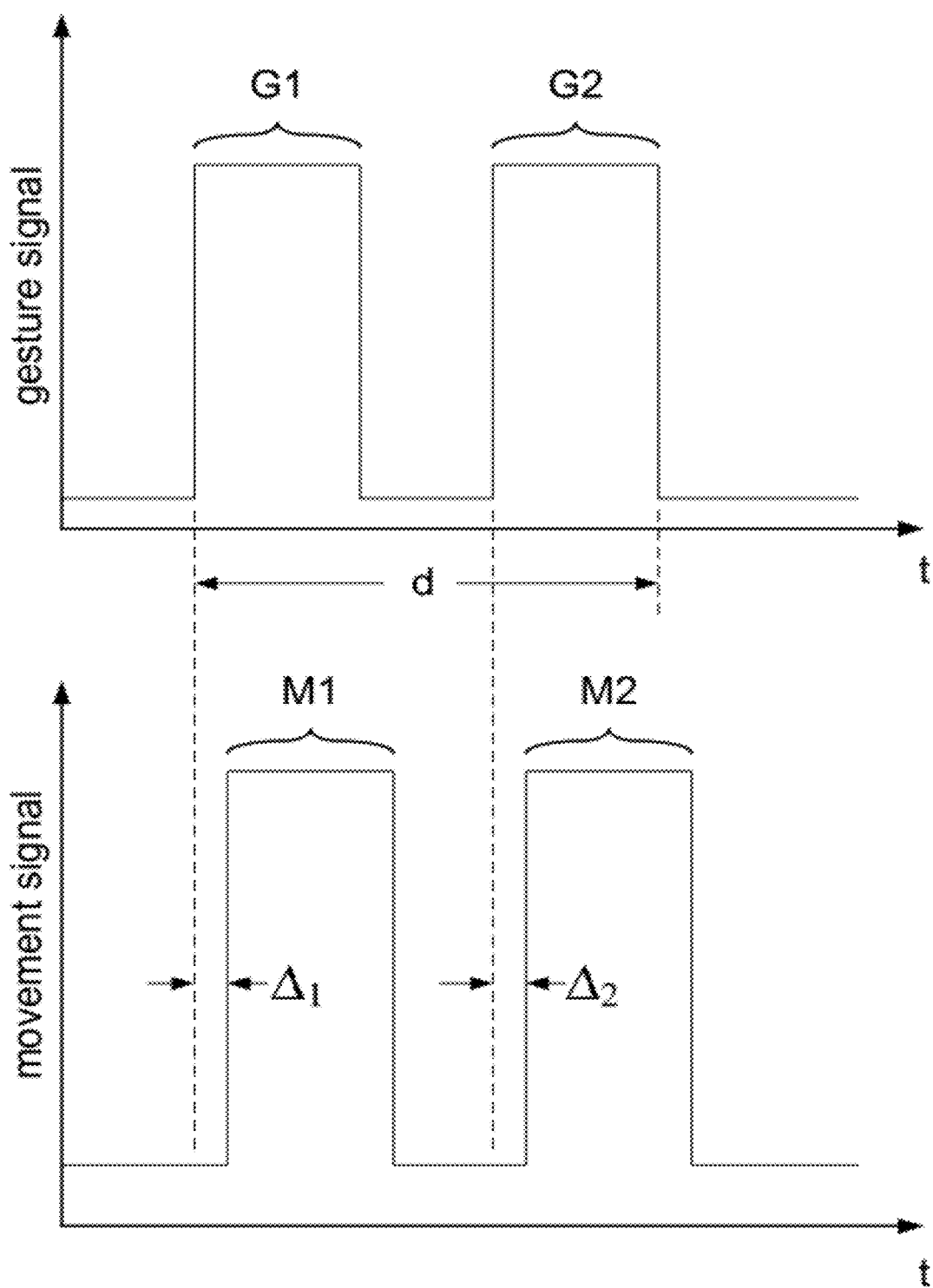
FIGS. 4A-4B illustrate exemplary signals detected by an electronic device in accordance with some embodiments.
Figure 4B:
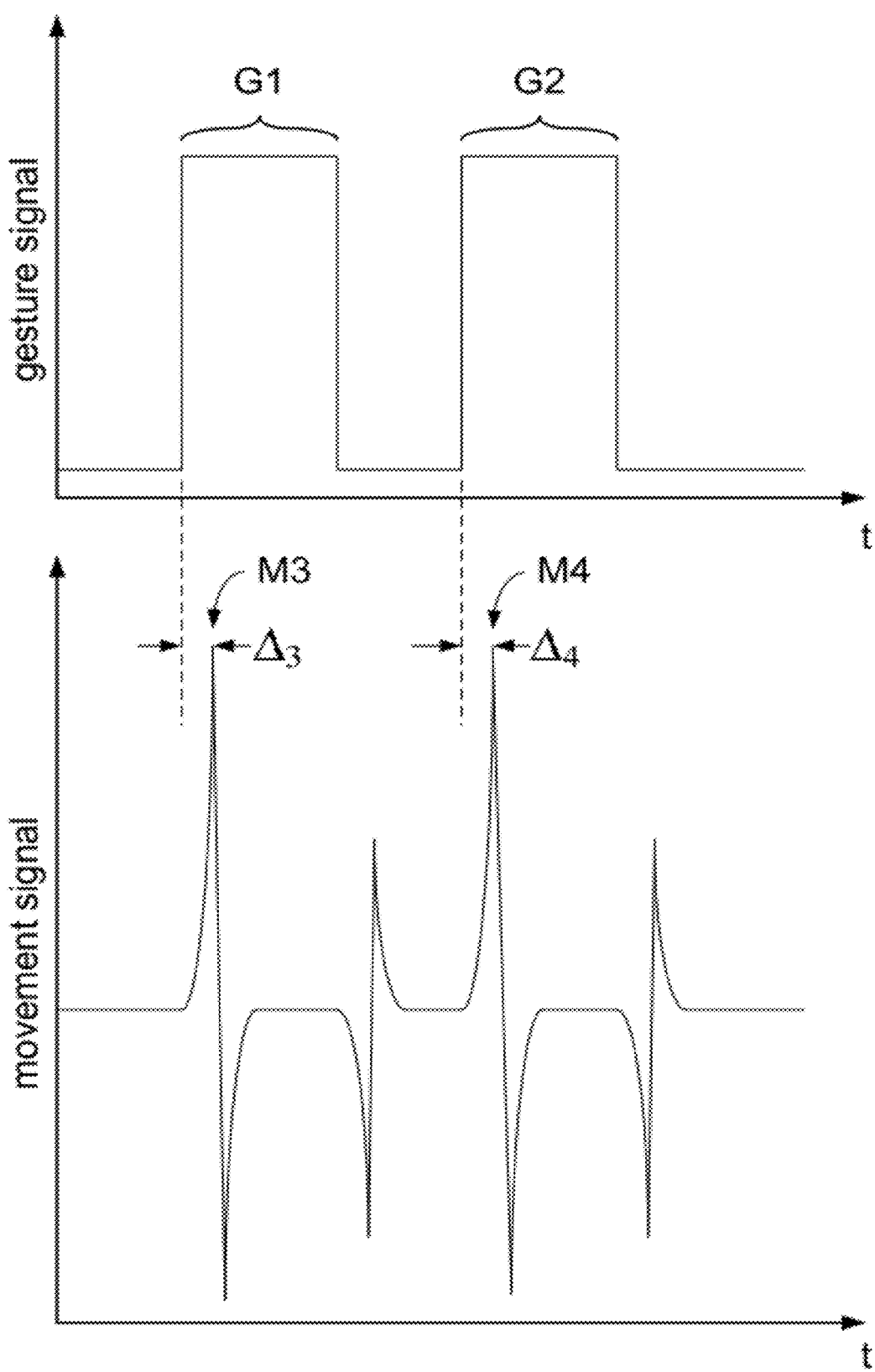

Below, FIGS. 1A-1B and 2 provide a description of exemplary devices. FIG. 3 illustrates an exemplary user interface that happens to be displayed while detecting concurrent user inputs. FIGS. 4A-4B illustrate exemplary signals detected in response to concurrent user inputs. FIGS. 5A-5E illustrate exemplary user interfaces that are displayed while establishing an impromptu network. FIGS. 6A-6B are flow diagrams illustrating a method of initiating a predefined operation with concurrent inputs. FIGS. 7A-7D are flow diagrams illustrating a method of establishing an impromptu network. The user interfaces in FIGS. 5A-5E are used to illustrate the processes in FIGS. 7A-7D.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input devices 116, to peripherals interface 118. I/O subsystem 106 may include display controller 156 and one or more input controllers 160 for other input or control devices. The one or more input controllers 160 receive/send electrical signals from/to other input devices 116. The other input devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons may include an up/down button for volume control of speaker 111 and/or microphone 113. The one or more buttons may include a push button. In some embodiments, the other input devices 116 includes a "home" button (e.g., 3204, FIG. 3).

Touch-sensitive display 112 provides an input interface and an output interface between the device and a user.

Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  books module 142;
  camera module 143 for still and/or video images;
  image management module 144;
  browser module 147;
  calendar module 148;
  widget modules 149, which may include one or more of:
    weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player module and a music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, books module 142 includes executable instructions to display, annotate, and share an electronic book (e.g., a text book), magazine, newspaper or other digital publication between a user and one or more other participants in accordance with user instructions.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input device for operation of device 100, the number of physical input devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input device instead of a touchpad (e.g., "home" button 3204, FIG. 3).

FIG. 1B is a block diagram illustrating exemplary components for event handling in accordance with some embodiments. In some embodiments, memory 102 (in FIG. 1A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements, taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2 is a block diagram illustrating exemplary distributed computer system 200, in accordance with some embodiments. In FIG. 1, system 200 includes a plurality of client devices 100 (e.g., 100-1, 100-2, 100-3, 100-4, and 100-5).

A respective client device (e.g., 100-1) is configured to establish one or more networks to communicate with other client devices 100. In some embodiments, the respective client device (e.g., 100-1) is configured to establish a network for direct communication with other client devices (e.g., 100-2 and device 100-3). In some embodiments, a first other client device (e.g., 100-2) may use the established network, or establish a separate network, to directly communicate with a second other client device (e.g., 100-3). Alternatively, the first other client device (e.g., 100-2) may communicate with the second other client device (e.g., 100-3) only through the respective client device (e.g., 100-1). In other words, the respective client device (e.g., 100-1) may serve as a host of the network, and conveys data between the first and the second other client devices (e.g., 100-2 and 100-3). In some embodiments, the first other client device (e.g., 100-2) may not be permitted to communicate with the second other client device (e.g., 100-3), while the first other client device (e.g., 100-2) is connected to a network established by the respective client device (e.g., 100-1).

In some embodiments, such networks include a wireless personal area network based on, for example, Bluetooth, Zigbee, Z-Wave, ultra-wideband, or infrared data association protocols. Such protocols typically enable communication with devices in proximity. However, it should be understood that the respective client device 100 may establish one or more networks based on the Wi-Fi protocol and/or any other communication protocols supported by the respective client device (e.g., wireless communication protocols supported by RF Circuitry 108, FIG. 1A).

In some embodiments, the respective client device (e.g., 100-1) is configured to communicate with other client devices (e.g., 100-2 and/or 100-3) through one or more routers (e.g., 204-1 and/or 204-2). In such embodiments, a respective router (e.g., 204-1) conveys data between the respective client device (e.g., 100-1) and other client devices (e.g., 100-2 and/or 100-3). In some embodiments, the respective router (e.g., 204-1) conveys data to client devices (e.g., 100-4 and 100-5) connected to a second router (e.g., 204-2) via one or more communications networks (e.g., 206). In some embodiments, the one or more communications networks 206 include the Internet. In other embodiments, the communications networks 206 include any local area network (LAN), wide area network (WAN), metropolitan area network, and/or a combination of such networks.

In some embodiments, the respective client device (e.g., 100-1) is configured to communicate with other client devices (e.g., 100-2 and/or 100-3) through a server (e.g., 202). In such embodiments, the server (e.g., 202) conveys data between the respective client device (e.g., 100-1) and other client devices (e.g., 100-2, 100-3, 100-4, and/or 100-5). In some embodiments, the server (e.g., 202) communicates with client devices (e.g., 100-1, 100-2, 100-3, 100-4, and/or 100-5) through the one or more communications network(s) (e.g., 206) and/or a router (e.g., 204-1 and/or 204-2). For example, the server (e.g., 202) may convey data between the respective client device (e.g., 100-1) and a third other client device (e.g., 100-4) by using multiple routers (e.g., 204-1 and 204-2) and the one or more communications network(s) (e.g., 206).

FIG. 3 illustrates an exemplary user interface for a menu of applications on portable multifunction device 100 in accordance with some embodiments. In some embodiments, user interface 300 includes the following elements, or a subset or superset thereof:

Signal strength indicator(s) 302 for wireless communication(s), such as cellular and Wi-Fi signals;
Time 304;
Bluetooth indicator 305;
Battery status indicator 306;
Tray 308 with icons for frequently used applications, such as:
  Phone 138, which may include an indicator 314 of the number of missed calls or voicemail messages;
  E-mail client 140, which may include an indicator 310 of the number of unread e-mails;
  Browser 147; and
  Video and music player 152, also referred to as iPod (trademark of Apple Inc.) module 152; and
Icons for other applications, such as:
  IM 141;
  Photos 144;
  Camera 143;
  Weather 149-1;
  Stocks 149-2;
  Books 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Device 100 may also include one or more physical buttons, such as "home" or menu button 3204. Menu button 3204 may be used to navigate to any application 136 in a set of applications that may be executed on device 100. Alternatively, in some embodiments, the menu button is implemented as a soft key in a GUI displayed on touch screen 112.

FIGS. 4A-4B illustrate exemplary signals detected by an electronic device (e.g., portable multifunction device 100, FIG. 1A) in accordance with some embodiments. The exemplary signals are plotted as functions of time (e.g., a horizontal axis represents time, and each vertical axis represents an intensity or amplitude of a respective signal). In FIGS. 4A-4B, the exemplary signals include a gesture signal and a movement signal detected by portable multifunction device 100 (or sensors of portable multifunction device 100). The gesture signal may be an electrical signal (e.g., digital or analog) produced by a touch-sensitive surface (e.g., a touch-sensitive surface of touch-sensitive display system 112, FIG. 1A). The movement signal may be an electrical signal (e.g., digital or analog) produced by a device motion sensor (e.g., accelerometer 168 in FIG. 168, gyroscope, inertial measurement unit, etc.).

In FIGS. 4A-4B, the illustrated gesture signal includes two gesture components: G1 and G2. Each gesture component represents a respective contact event (e.g., a finger or a portion of a hand contacting the touch-sensitive surface). As illustrated, the gesture components G1 and G2 have a break or pause in-between the two gesture components G1 and G2, which indicates a lift-up of the contact off the touch-sensitive surface. In other words, the gesture signal illustrated in FIG. 4A may be detected in response to a series of events including: a touch-down (i.e., contact), a lift-off (i.e., absence of contact), a second touch-down (i.e., contact), and a second lift-off (i.e., absence of contact) on the touch-sensitive surface. In some embodiments, the illustrated gesture signal may be generated in response to repeated knocking (which is called herein a "knock-knock" or "2-knock" gesture) on the touch-sensitive surface. FIG. 4A also illustrates a duration, d, of the detected gesture. In some embodiments, the duration of a gesture is a time interval between a touch-down event of a first gesture component of the gesture and a lift-off of a last gesture component of the gesture (or a time interval between a first touch-down event of the gesture and a last lift-off of the gesture).

The movement signal illustrated in FIG. 4A includes two movement components: M1 and M2. Each movement component represents a respective movement event (e.g., a movement of the device). In some embodiments, the movement signal represents a speed of the device, an acceleration of the device, or a combination thereof. In some embodiments, the movement signal represents an absolute position of the device (e.g., a device position coordinate) or changes thereof. The movement signal illustrated in FIG. 4A may be detected in response to a knock-knock gesture (or in response to movements of the device caused by the knock-knock gesture).

The timing of the gesture components detected by the touch-sensitive surface and the movement components detected by the device motion sensor may not be identical (e.g., the first gesture component G1 rises before the first movement component M1 in FIG. 4A). This may be due to an inertia of the device, delay in the device motion sensor and/or the touch-sensitive surface, sensor noise, and/or additional delays in the signal processing circuitry.

In some embodiments, the device determines whether the gesture signal and the movement signal are concurrent (or correlated). In some embodiments, the device determines whether the gesture signal and the movement signal are concurrent based on a time (or time difference) between the touch-down event of a first gesture component and an onset of a first movement component (which is called herein "the first time difference" $\Delta_1$) and/or a time (or time difference) between the touch-down event of a second gesture component and an onset of a second movement component (which is called herein "the second time difference" $\Delta_2$). For example, the device may determine that the gesture signal and the movement signal are concurrent in accordance with a determination that the first time difference $\Delta_1$ and/or the second time difference $\Delta_2$ do not exceed a concurrency threshold (e.g., a predefined time threshold).

The device performs a predefined operation in response to detecting concurrent inputs (or in response to determining that the gesture signal and the movement signal are concurrent), which provides advantages over using a single input signal source (e.g., only one of: the gesture signal or the movement signal). For example, traditional touch-sensitive surfaces are not configured to detect the force of gesture inputs. However, the device can detect the force of gesture inputs by using the concurrent inputs, because the force of gesture inputs on the device causes movements of the device. Such concurrent inputs are also more accurate compared to analyzing touch input or motion events in isolation, because touch inputs or motion events in isolation may be subject to erroneous or unintended operations. For example, the device may be accidentally dropped or moved around, which generates a movement signal. A user may touch the touch-sensitive surface unintentionally, which generates a gesture signal. However, such accidental or unintended events are less likely to generate concurrent inputs. Thus, the device reduces the chance of accidentally or unintentionally performing an operation by requiring the detection of the concurrent inputs. Therefore, the concurrent inputs are highly desirable for critical tasks (e.g., tasks that have high security or privacy needs).

FIG. 4B illustrates the movement signal in accordance with some embodiments. The movement signal illustrated in FIG. 4B represents an acceleration of the device. The illustrated movement signal includes multiple peaks and valleys, and each gesture component corresponds to two peaks and two valleys. In some embodiments, the device determines whether the gesture signal and the movement signal are concurrent based on the time between the touch-down event of a first gesture component and the peak M3 (which is called herein $\Delta_3$) and/or the time between the touch-down event of a second gesture component and the peak M4 (which is called herein $\Delta_4$).

In FIGS. 4A-4B, the exemplary signals are illustrated offset for illustration purposes only. Furthermore, it should be noted that the amplitudes of the illustrated signals may not be drawn to scale. For example, the gesture signal may have higher amplitudes than the movement signal, or vice versa. Furthermore, the first gesture component G1 may have higher amplitude than that of the second gesture component G2, or vice versa. The first movement component M1 may have higher amplitude than that of the second movement component M2, or vice versa.

User Interfaces and Associated Processes

Attention is now directed towards embodiments of user interfaces ("UI") and associated processes that may be implemented on an electronic device with a display and a touch-sensitive surface (or a touch screen display), such as portable multifunction device 100.

FIGS. 5A-5E illustrate exemplary user interfaces that are displayed while establishing an impromptu network in accordance with some embodiments. The user interfaces in these figures are used to illustrate the processes described below, including the processes in FIGS. 6A-6B and 7A-7D.

Figure 5A:
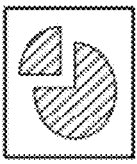

FIG. 5A illustrates exemplary user interfaces displayed on touch screens 112-1 and 112-2 of two devices 100-1 and 100-2. Device 100-1 is associated with (and operated by) a first user, and device 100-2 is associated with (and operated by) a second user who is different from the first user. Touch screens 112-1 and 112-2 each display a different portion of a textbook (using books module 142, FIG. 1A). The user interface displayed on touch screen 112-1 also includes annotation 510, which is information added by the first user, such as a note or comment. In some embodiments, annotation 510 is stored locally on device 100-1. In FIG. 5A, a gesture including multiple contacts (e.g., 505, 507, 509, and 511) is detected on touch screen 112-1 of device 100-1. In some embodiments, the gesture may be a knock-knock gesture, which includes a repetition of the multiple contacts (e.g., 505, 507, 509, and 511). The gesture on the touch screen 112-1 is made by the first user associated with device 100-1.

Figure 5B:
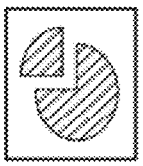

In FIG. 5B, after the gesture including the multiple contacts (e.g., 505, 507, 509, and 511) is detected on touch screen 112-1, the user interface that was displayed on touch screen 112-1 before the gesture continues to be displayed on touch screen 112-1. FIG. 5B also illustrates that a second gesture including multiple contacts (e.g., 513, 515, 517, and 519) is detected on touch screen 112-2 of device 100-2 while a network connection time window to the first device 100-1 is open. The second gesture may be a knock-knock gesture, which includes a repetition of the multiple contacts (e.g., 513, 515, 517, and 519). Alternatively, the second gesture may be a single knock gesture, 3-knock gesture, or any other predefined network-response gesture. The gesture on the touch screen 112-2 is made by the second user associated with device 100-2.

FIG. 5C illustrates that device 100-2 displays on touch screen 112-2 a user interface currently displayed on touch screen 112-1 of device 100-1 in response to the network-response gesture by the second user and the establishment of a network connection between the first device 100-1 and the second device 100-2. The user interface displayed on touch screen 112-2 includes annotation 510 displayed on touch screen 112-1. In other words, the user interface displayed on touch screen 112-2 is the same as the user interface displayed on touch screen 112-1. Device 100-2 typically displays the identical user interface by establishing a network connection with device 100-1 (or by joining a network hosted by device 100-1). In some embodiments, when the first user changes information displayed on touch screen 112-1 (e.g., by scrolling or by adding a new annotation), device 100-2 also displays the changed information on touch screen 112-2, thereby synchronizing the information displayed on the second device 100-2 with the information displayed on the first device 100-1.

Figure 5D:
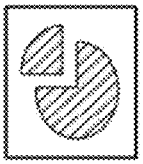

FIG. 5D illustrates an alternative user interface displayed in response to the first user's gesture on touch screen 112-1 of device 100-1 (e.g., a gesture including multiple contacts, such as 505, 507, 509, and 511, as illustrated in FIG. 5A). In FIG. 5D, device 100-1 displays sign 512, which indicates that device 100-1 is waiting for communication (e.g., a request to establish a network connection) from one or more responding devices (e.g., 100-2). In some embodiments, sign 512 includes a countdown that indicates the remaining time in a network connection time window. As illustrated in FIG. 5D, device 100-2 may display sign 514, which indicates that device 100-1 has invited device 100-2 to join a communication network. In some embodiments, sign 514 includes a countdown that indicates the remaining time to join the communication network. FIG. 5D also illustrates that a network-response gesture including multiple contacts (e.g., 521, 523, 525, and 527) is detected on touch screen 112-2 of device 100-2.

Figure 5E:
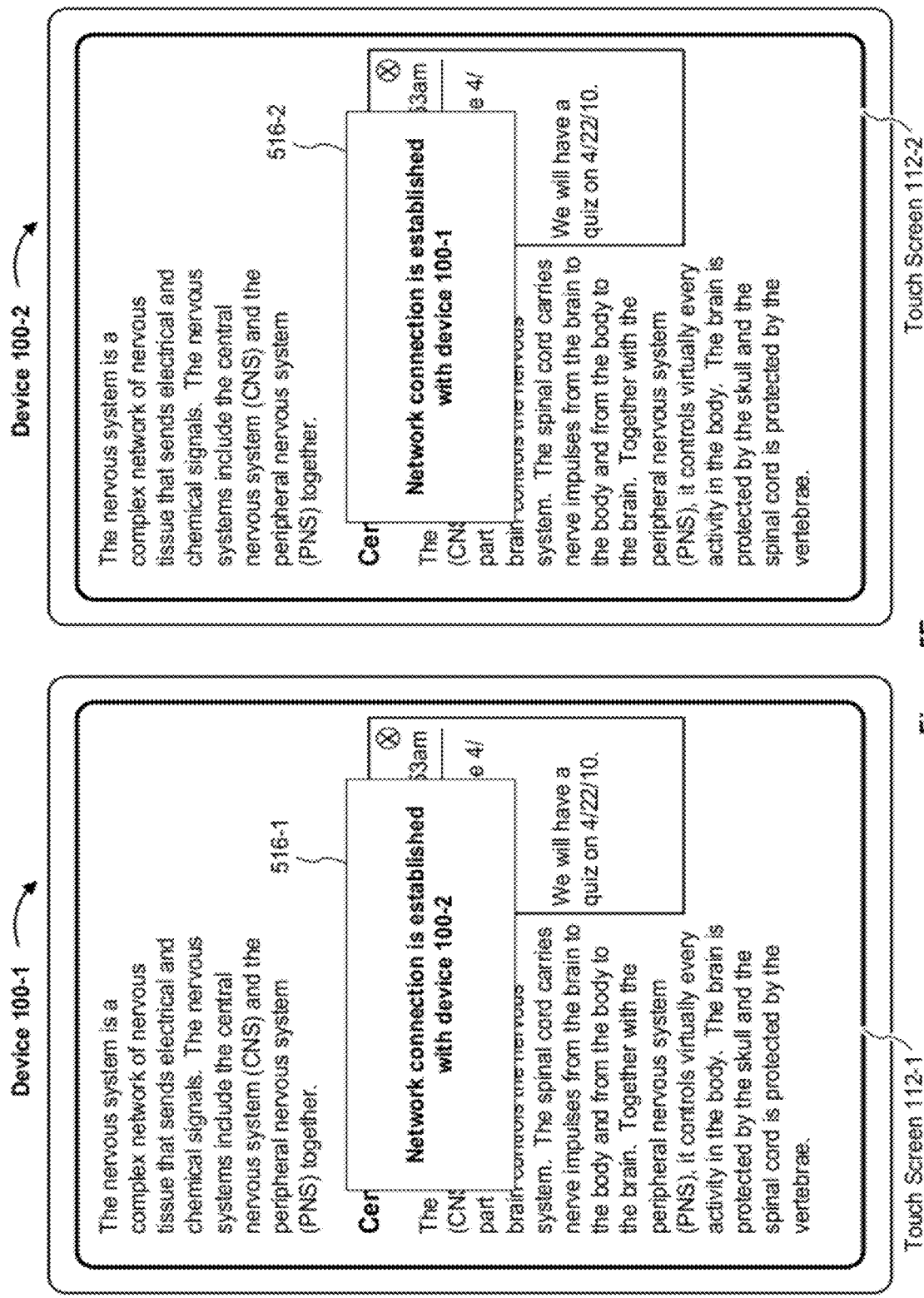

FIG. 5E illustrates an alternative user interface displayed in response to a second user's network-response gesture on touch screen 112-2 of device 100-2 (e.g., a gesture illustrated in FIG. 5B or FIG. 5D). In FIG. 5E, device 100-2 displays on touch screen 112-2 a user interface currently displayed on touch screen 112-2. In addition, device 100-1 displays sign 516-1, which indicates that network connection is established with device 100-2, and device 100-2 displays sign 516-2, which indicates that network connection is established with device 100-1.

FIGS. 6A-6B are flow diagrams illustrating method 600 of performing a predefined operation in response to detecting concurrent inputs in accordance with some embodiments. Method 600 is performed at an electronic device (e.g., portable multifunction device 100, FIG. 1) with a touch-sensitive surface (e.g., touch-sensitive display system 112, FIG. 1A) and a device motion sensor configured to detect motion of the device (e.g., accelerometer 168 in FIG. 1A, gyroscope, inertial measurement unit, etc.). In some embodiments, the device includes a touch screen display and the touch-sensitive surface is on the touch screen display. In some embodiments, the device includes a display separate from the touch-sensitive surface. Some operations in method 600 may be combined and/or the order of some operations may be changed.

As described below, method 600 provides a more accurate way to identify a gesture. As noted above, requiring that device movement be detected concurrently with the gesture on the touch-sensitive surface leads to a more accurate determination of the gesture. For example, a "knock-knock" gesture on a touch-sensitive surface is more likely to be correctly interpreted as such if concurrent device motion is detected with the knuckles contacting the touch-sensitive surface, rather than just analyzing the contacts on the touch-sensitive surface to interpret the gesture. More accurate gesture recognition reduces the cognitive burden on a user, thereby creating a more efficient human-machine interface. For battery-operated electronic devices, more accurate gesture recognition conserves power and increases the time between battery charges by reducing the need to undo and/or redo gestures that were not interpreted correctly.

The device detects (602) a predefined gesture (e.g., a knock-knock gesture including contacts 305, 307, 309, and 311, FIG. 3) on the touch-sensitive surface (e.g., touch-sensitive display system 112, FIG. 1A). The predefined gesture has one or more gesture components (e.g., G1 and G2, FIG. 4A). A respective gesture component occurs at a respective gesture component time.

In some embodiments, the predefined gesture on the touch-sensitive surface is (604) a gesture with a duration below a predefined duration threshold (e.g., the duration d in FIG. 4A is below a predefined threshold). In some embodiments, the duration threshold is 0.5 seconds, 1 second or any reasonable threshold that indicates that brief contacts have been made with the touch-sensitive surface (e.g., a knock-knock gesture).

The device detects (606) a predefined movement of the electronic device with the device motion sensor (e.g., accelerometer 168, FIG. 1A). The predefined movement has one or more movement components (e.g., M1 and M2, FIG. 4A). A respective movement component occurs at a respective movement component time.

In some embodiments, the predefined movement of the electronic device is (608) movement of the device that corresponds to an acceleration satisfying a predefined acceleration threshold. In some embodiments, the acceleration threshold is determined so as to correspond to an acceleration of the device that would result from the force caused by a quick impact on the touch-sensitive surface (e.g., a knock gesture with the knuckles) that is greater than would typically be used to interact with the touch-sensitive surface (e.g., a gesture made with the soft underside of a finger). In such embodiments, the predefined movement of the electronic device is movement of the device that corresponds to an acceleration above the predefined acceleration threshold. The predefined acceleration threshold may be used to exclude movement that corresponds to an acceleration that is less than would typically be used to interact with the touch-sensitive surface. While the force is typically detected using an accelerometer, which determines an acceleration of the device in response to the predefined gesture, other proxy measurements of force or direct measurements of force may also be used. A typical acceleration value that would be detected in response to a knock gesture would be 0.5, 1 or 1.5 meters per second squared.

In some embodiments, the predefined gesture includes (610) multiple gesture components (e.g., two tap gestures for a knock-knock) and the predefined movement includes a corresponding number of multiple movement components (e.g., four peaks and four valley, FIG. 4B). In some embodiments, the predefined gesture includes multiple gesture components (e.g., two tap gestures for a knock-knock) and the predefined movement includes a same number of multiple movement components (e.g., two movement components for a knock-knock, FIG. 4A).

In some embodiments, the predetermined gesture and movement are (612) consistent with inputs that would be detected in response to a hand knocking on the touch-sensitive surface (e.g., a double tap gesture with two or more knuckles and slight movement of the device backwards and forwards twice).

In response to detecting the predefined gesture and the predefined movement (614, FIG. 6B), the device, in accordance with a determination that the one or more gesture components and the one or more movement components satisfy predefined concurrency criteria, performs (616) a predefined operation that is associated with concurrent detection of the predefined gesture and the predefined movement (e.g., an operation for establishing a communication network).

In some embodiments, a first gesture component of the predefined gesture is detected (618) at a first gesture time (e.g., G1 in FIG. 4A), and a second gesture component of the predefined gesture is detected at a second gesture time (e.g., G2 in FIG. 4A). Furthermore, a first movement component of the predefined movement is detected at a first movement time (e.g., M1 in FIG. 4A), and a second movement component of the predefined movement is detected at a second movement time (e.g., M2 in FIG. 4A). In some embodiments, the one or more gesture components and the one or more movement components are determined to satisfy the predefined concurrency criteria only if an amount of time between the first gesture time and the first movement time (e.g., $\Delta_1$ in FIG. 4A) is less than a first concurrency threshold, and an amount of time between the second gesture time and the second movement time (e.g., $\Delta_2$ in FIG. 4A) is less than a second concurrency threshold. In some embodiments, the first concurrency threshold and the second concurrency threshold are the same. In some other embodiments, the first concurrency threshold is distinct from the second concurrency threshold. Alternatively, the one or more gesture components and the one or more movement components may be determined to satisfy the predefined concurrency criteria if the amount of time between the first gesture time and the first movement time is less than a concurrency threshold, or the amount of time between the second gesture time and the second movement time is less than the concurrency threshold. It should be understood that the device can use an analogous process to determine whether any number of discrete movement/gesture pairs are synchronized (e.g., a 3-knock gesture or a 4-knock gesture). In some embodiments, a first operation is performed in response to detecting a 2-knock gesture, while a second operation that is distinct from the first operation is performed in response to detecting a 3-knock gesture.

In some embodiments, the concurrency threshold is (620) less than 0.1 seconds. In some embodiments, the concurrency threshold is 0.005 seconds, 0.01 or 0.05 seconds or any reasonable threshold that reduces the likelihood of accidental input while still ensuring that the touch gesture and the detected motion were detected at substantially the same time.

In some embodiments, the predefined operation is (622) a networking operation. For example, the predefined operation is an operation for establishing a communication network with other devices.

In some embodiments, the predefined operation is (624) a networking operation with other devices within a limited network range of the electronic device (e.g., an operation for establishing a network with other devices within a wireless communication range).

In some embodiments, the device receives (626) data indicating that one or more other devices in the limited network range have detected a similar combination of predefined gesture and predefined motion (e.g., a knock gesture, 2-knock gesture, or 3-knock gesture), and in response to receiving the data, establishes a network connection with the one or more other devices.

In accordance with a determination that the one or more gesture components and the one or more movement components do not satisfy the predefined concurrency criteria, the device foregoes (628) performing the predefined operation.

In some embodiments, the predefined concurrency criteria is only satisfied when the device is in a particular state (e.g., a particular application is running, a particular user interface is displayed, and/or the gesture is detected in a particular region of the touch-sensitive surface). In some embodiments, the gesture is a system level gesture that is detected without regard to the current application that is running, the location of the gesture, or the current state of the device.

Note that details of other processes described herein with respect to method 600 are also applicable in an analogous manner to method 700. For example, the network-initiation input described with reference to FIG. 7A may have one or more of the characteristics of the concurrent inputs described herein with reference to method 600. For brevity, these details are not repeated below.

FIGS. 7A-7D are flow diagrams illustrating a method 700 of establishing an impromptu network in accordance with some embodiments. Method 700 is performed at an electronic device (e.g., portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to establish an impromptu network. The method reduces the cognitive burden on users when establishing a network, thereby creating a more efficient human-machine interface. For battery-operated electronic devices, enabling users to establish a network faster and more efficiently conserves power and increases the time between battery charges.

The device receives (702) a network-initiation input from a user (e.g., a knock-knock gesture on the touch-sensitive surface or an activation of a predefined user interface object displayed on the touch-sensitive surface).

In some embodiments, the network-initiation input comprises (704) a predefined network-initiation gesture that includes a gesture component detected on the touch-sensitive surface of the electronic device (e.g., contacts 305, 307, 309, and 311 on touch screen 112, FIG. 3). However, it should be understood that other types of gestures that do not include a gesture component detected on the touch-sensitive surface could also be used as the network-initiation gesture (e.g., motion based gestures identified with an integrated accelerometer in the electronic device, image based gestures captured on an integrated video camera in the electronic device, etc). In some embodiments, the network-initiation gesture is user customizable or user selectable (e.g., the user of the electronic device can select a predefined gesture as the network-initiation gesture).

In some embodiments, the network-initiation gesture is not associated (706) with any user interface element displayed on the display of the electronic device. In other words, the network-initiation gesture (e.g., a knocking gesture) detected on the touch-sensitive surface is not tied to any particular element of the graphical user interface displayed on the display (e.g., the network-initiation gesture is not a selection of a menu item or button on a touch screen display).

In response to receiving the network-initiation input from the user, the device opens (708) a network connection time window for establishing one or more network connections with a plurality of candidate devices within a predefined network range of the electronic device. In some embodiments, opening a network connection time window includes entering into a network establishing mode for establishing one or more network connections with the plurality of candidate devices. The network establishing mode may not include any changes to a user interface displayed on the display of the device (i.e., the user interface before entering the network establishing mode continues to be displayed after entering the network establishing mode). The network connection time window has a predefined expiration time. In some embodiments, the network connection time window is a brief time window (e.g., less than 30 seconds, less than 10 seconds, or less than 5 seconds), so as to reduce the likelihood that a network connection will be accidentally established with an unintended candidate device. As used herein, the term "candidate device" means any device within the predefined network range that is eligible to establish a network connection with the electronic device (e.g., the candidate devices may be limited to those devices within the predefined network range that have a predefined application installed or are on an "approved list" of the electronic device, as described in greater detail below). Additionally, the electronic device (e.g., device 100-1 in FIG. 5A) may also be called an "initiating device," because it is the electronic device at which the network-initiation input was received.

In some embodiments, the plurality of candidate devices within the predefined network range includes (710) only devices connected to a same subnet as the electronic device. Devices in the same subnet are typically addressed with a common bit-group in their Internet Protocol (IP) addresses. For example, when a subnet mask is 255.255.255.0, a first device that has an IP address of 192.168.1.1 and a second device that has an IP address of 192.168.1.2 are deemed to be connected to a same subnet.

In some embodiments, the plurality of candidate devices within the predefined network range includes (712) only devices connected to a predefined set of one or more network routers (e.g., devices 100-1, 100-2, and 100-3 connected to router 204-1, FIG. 2). For example, in a classroom setting, the students and the teacher will typically all be connected to the same wired/wireless router. In some embodiments, the predefined set of one or more network routers includes only one router (e.g., the router with which the electronic device is connected). In some embodiments, multiple different predefined routers (e.g., routers 204-1 and 204-2 in FIG. 2) are included in the predefined set of one or more network routers (e.g., wireless routers that are known to be located within a predefined geographical area, such as a school building or workplace, or both a wired and wireless router for a particular classroom or meeting room).

In some embodiments, the plurality of candidate devices includes (714) only devices in a predefined group of authorized devices within the predefined network range. In other words, in these embodiments, network connections are only established between the electronic device and devices that were previously authorized by a user of the electronic device, thereby reducing the likelihood that unintended devices will be connected to the electronic device via a network connection. For example, the electronic device may have a buddy list or a list of class members or authorized devices that is either explicitly specified by the user or implicitly determined (e.g., based on a user-generated contact list or frequently contacted users) that is used to determine which devices are candidate devices.

In some embodiments, the plurality of candidate devices includes (716) only devices with a predefined software application (e.g., books application 142 in FIG. 1A or other content collaboration application). In some embodiments, an invitation is only sent to devices that have the predefined software application installed. In some embodiments, an invitation can only be received and responded to from within the predefined software application, so that even if a device receives an invitation, if the device does not have the predefined software application installed it cannot respond to the invitation. In some embodiments, the predefined software application on a candidate device causes the candidate device to transmit a request to establish a network connection (e.g., a respective request to form a network connection between a respective device and the electronic device is only sent from the respective device when the predefined software application is running on the respective device and a network-response gesture is detected).

The device receives (718, FIG. 7B), while the network connection time window is open, one or more respective requests to form a network connection sent from one or more respective responding devices in the plurality of candidate devices within the predefined network range. In some embodiments, the request to form a network connection is a response to an invitation. In some embodiments, the request to form a network connection is an indication that the responding device is available to establish the network connection, and the indication is received without the device sending an invitation to the responding device. For example, when the users of all of the devices are in the same room, a user of the electronic device could verbally indicate to the users of the candidate devices that the user wants to establish a network connection between the devices. The user of the electronic device then performs a network-initiation gesture on the user's device and the other users perform a network-response gesture on their own devices in response to seeing and/or hearing the user perform the network-initiation gesture. In other words, the timing of the network-initiation and network-response gestures is, in some embodiments, coordinated not by the devices but rather by a direct communication between users of the devices (e.g., real-time in-person verbal or visual communication). As used herein, the term "responding device" means a candidate device that has requested that a network connection be formed with the electronic device. It should be understood that a "responding device" may not be responding to an invitation or other communication from the electronic device, but may, instead be sending a request based on an input received from a user of the responding device, where the user is responding to an external indication that the network connection time window is open (e.g., a visual or audible indication from a user of the electronic device).

In some embodiments, the respective responding device requests (720) to form a network connection in response to detecting a network-response input from a respective user of the respective responding device (e.g., a knock gesture or a knock-knock gesture on touch screen 112-2, FIG. 5B or an activation of a user interface object displayed on touch screen 112-2). In some embodiments, the respective responding device sends to the device a request to form a network connection in response to detecting a network-response input from the respective user of the respective responding device.

In some embodiments, the network-response input is (722) a predefined network-response gesture that includes a gesture component detected on a touch-sensitive surface of the respective responding device (e.g., a knock gesture or a knock-knock gesture on touch screen 112-2, FIG. 5B). However, it should be understood that other types of gestures that do not include a gesture component detected on the touch-sensitive surface could alternatively be used as the network-response gesture (e.g., motion based gestures, accelerometer based gestures, image based gestures captured on an integrated video camera, etc). In some embodiments, the network-response gesture is user customizable or user selectable (e.g., the user of the respective responding device can select a predefined gesture as the network-response gesture).

In some embodiments, the predefined network-response gesture is not associated (724) with any user interface element displayed on a display of the respective responding device. In other words, the network-response gesture detected on the touch-sensitive surface is not tied to any particular element of the graphical user interface displayed on the display (e.g., the network-response gesture, such as a knocking gesture, is not a selection of a menu item or button on a touch screen display).

In some embodiments, the network-initiation input is (726) a predefined network-initiation gesture, and the network-response gesture is a same type of gesture as the network-initiation gesture (e.g., the network-initiation gesture and network-response gesture are both knocking gestures on the touch-screen display).

In some embodiments, the network-initiation input is (728) a predefined network-initiation gesture, and the network-response gesture is distinct from the network-initiation gesture (e.g., the network-initiation gesture is a knock-knock gesture, while the network-response gesture is a single knock gesture).

In some embodiments, while the network connection time window is open and prior to detecting the network-response input on a touch-sensitive surface of the respective responding device, the respective responding device does not display (730) any visual indication that a network connection may be established with the electronic device. For example, the respective responding device (e.g., device 100-2, FIG. 5B) does not display any visual indication that a network connection may be established with the electronic device by performing the network-response gesture. In other words, the candidate devices do not visually prompt users to respond to the opening of the network connection time window. Rather users of the devices are typically prompted directly by the user of the electronic device. For example, when the users of the candidate devices see/hear that the user has performed the network-initiation operation (e.g., by seeing or hearing the user perform a knock-knock gesture on the touch-sensitive surface of the electronic device), the users are able to, without any prompting from their devices, request a network connection with the electronic device (e.g., by performing a gesture at the respective candidate device, such as a knocking gesture, that causes the respective candidate device to send a request to the electronic device to establish a network connection between the electronic device and the respective candidate device, thereby indicating that the respective candidate device is a respective responding device). Additionally, the lack of visual indication that the network connection window is open reduces the likelihood that unintended network connections will be established with candidate devices, because even if these devices could request that the network connection be established, their users will not be provided with any visual indication of when to perform the network-response gesture. Thus, while it is relatively easy for users to coordinate the network-initiation and network-response gestures when they intend to do so, it is relatively difficult for unintended users to accidentally establish a network connection with the electronic device.

In some embodiments, while the network connection time window is open, the device monitors (732) the plurality of candidate devices for communications indicating that one or more of the candidate devices have detected a network-response input. In some embodiments, the responding devices send out a network ping when they detect a network-response input (e.g., a network-response gesture such as a knock gesture). In some embodiments, receiving a respective request to form a network connection includes detecting a communication from a respective responding device indicating that the respective responding device has detected a respective network-response input at the respective responding device.

In some embodiments, after (e.g., in response to) receiving the network-initiation input from the user (e.g., a gesture including multiple contacts, such as 505, 507, 509, and 511, FIG. 5A), the device sends (734) an invitation to the plurality of candidate devices. The invitation has a predefined expiration time. The invitation is sent by the electronic device automatically, without further user intervention while the network connection time window is open. In some embodiments, receiving a respective request to form a network connection includes receiving a respective response to the invitation from a respective responding device prior to the predefined expiration time of the invitation. The respective response is generated in response to detecting a respective network-response input at the respective responding device (e.g., a gesture including multiple contacts, such as 513, 515, 517, and 519, FIG. 5B). In some embodiments, the predefined expiration time of the invitation is the same as the predefined expiration time of the network connection time window (e.g., countdowns shown on touch screen 112-1 of device 100-1 and touch screen 112-2 of device 100-2). In some embodiments, the predefined expiration time of the invitation is different from (e.g., earlier or later than) the expiration time of the network connection time window.

In response to receiving a respective request from a respective responding device within the predefined network range while the network connection time window is open, the device establishes (736, FIG. 7C) a respective network connection with the respective responding device. In some embodiments, the device establishes one or more network connections that enable multiple respective responding devices to communicate with the electronic device (e.g., a network connection is established between the electronic device and each respective responding device of a plurality of responding devices from which a request to form the network connection was received). In some embodiments, the network connection is formed after the predefined expiration time has elapsed. In some embodiments, the network connection for each respective responding device is formed in response to the electronic device receiving the request from the respective responding device. In other words, in these embodiments, network connections to the responding devices are established on a rolling basis as the devices send requests to form a network connection.

In some embodiments, the one or more network connections enable (738) the devices to share data between a plurality of different applications on the electronic device and corresponding applications on one or more respective connected responding devices (e.g., the devices may share data using books application 142, calendar 148, browser 147, and notes 153).

In some embodiments, the one or more network connections are limited (740) to sharing information in a predefined software application that is running on the respective connected responding devices (e.g., sharing information in a textbook application only). In some embodiments, the respective network connections with a plurality of the respective responding devices are limited to sharing information in a predefined software application that is running on each of the plurality of respective responding devices. For example, all of the devices (e.g., the electronic device and the responding devices) may be using a same textbook application or other content collaboration application that enables the devices to share comments, annotations, note cards, quizzes, etc. In some embodiments, the network connection between the electronic device and the respective responding device is terminated when the predefined software application is closed on the respective responding device. In some embodiments, the network connection between the electronic device and the respective responding device is terminated when the electronic device closes the predefined software application. In some embodiments, when there are network connections between the electronic device and multiple respective responding devices that enable the electronic device to communicate with the respective responding devices and also enable the respective responding devices to communicate with each other, the network connections are terminated for all of the respective responding devices when the electronic device (e.g., the originating device at which the network-initiation input was detected) closes the predefined software application. For example, for a teacher using the electronic device with network connections with multiple students that enable the responding devices operated by the students to communicate with each other, when the teacher closes the application on the electronic device, one or more network connections between the responding devices operated by the students are closed.

In some embodiments, the one or more network connections are used (742) to synchronize content displayed in the predefined software application on the electronic device with content displayed in the predefined software application on one or more respective connected responding devices (e.g., touch screen 112-1 of device 100-1 and touch screen 112-2 of device 100-2 in FIG. 5C). For example, when a user of the electronic device changes pages in the application or scrolls through content in the predefined software application, the predefined software applications on the responding devices are updated accordingly. In some embodiments, each of the devices has a copy of the same content (e.g., a textbook) and the devices synchronize how the content is displayed. In some embodiments, annotations to the content are temporarily synchronized between the devices. For example, during the network connection, annotations (e.g., annotation 510, FIG. 5A) made by the user of the electronic device are only temporarily displayed on all of the responding devices with which a network connection has been established and the temporarily displayed annotations cease to be displayed when the network connection is terminated. In some embodiments, the annotations made by the user of the electronic device are stored on one or more respective responding devices with which a network connection has been established, so that the displayed annotations can be displayed on the one or more respective responding devices even after the network connection with the electronic device has been terminated.

In some embodiments, the one or more network connections are used (744) to share content that is specific to the predefined software application between the electronic device and one or more respective connected responding devices (e.g., annotations or files related to the predefined software application are shared over the network connection). In some embodiments, the content that can be shared over the network connection is limited to content specific to the predefined software application in order to reduce the likelihood that the security of the electronic device will be compromised by the network connection.

In some embodiments, a user interface that was displayed on the display of the electronic device prior to receiving the network-initiation input continues (746) to be displayed on the display of the electronic device at least until the respective network connection is established. For example, the user interface displayed on touch screen 112-1 of device 100-1 prior to receiving the network-initiation input (FIG. 5A) continues to be displayed on touch screen 112-1 until the respective network connection is established (FIG. 5B). In other words, the electronic device may not display any visual indication that a network connection time window is open. In some embodiments, once one or more network connections are established, the user interface is adjusted to indicate which other users/devices have established network connections to the electronic device (e.g., sign 516-1, FIG. 5E).

In some embodiments, requests to form a network connection are received (748) from two or more respective responding devices of the plurality of candidate devices within the predefined network range (e.g., devices 100-2 and 100-3, FIG. 2). Network connections are established between the electronic device (e.g., device 100-1, FIG. 2) and the two or more respective responding devices (e.g., devices 100-2 and 100-3, FIG. 2).

In some embodiments, one of the network connections enables (750) the two or more respective responding devices to communicate with each other.

In some embodiments, after the predefined expiration time of the network connection time window, the device receives (752) a request from a respective candidate device of the plurality of candidate devices in the predefined network range to form a network connection with the electronic device, and prevents a network connection from being established between the electronic device and the respective candidate device. In other words, when the request is received from a first device within the predefined network range and while the network connection time window is open, a network connection is established between the electronic device and the first device. In contrast, when a request is received from a second device outside of the predefined network range and/or while the network connection time window is not open (e.g., prior to when the network connection time window is opened or after the network connection time window has closed), no network connection is established between the electronic device and the second device.

The operations in the information processing methods described above may be implemented by running one or more functional modules in information processing apparatus such as general purpose processors or application specific chips. These modules, combinations of these modules, and/or their combination with general hardware (e.g., as described above with respect to FIG. 1A) are all included within the scope of protection of the invention.

The operations described above with reference to FIGS. 6A-6B and 7A-7D may be implemented by components depicted in FIGS. 1A-1B. For example, detection operation 602, performing operation 616, and foregoing operation 628—may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 8:
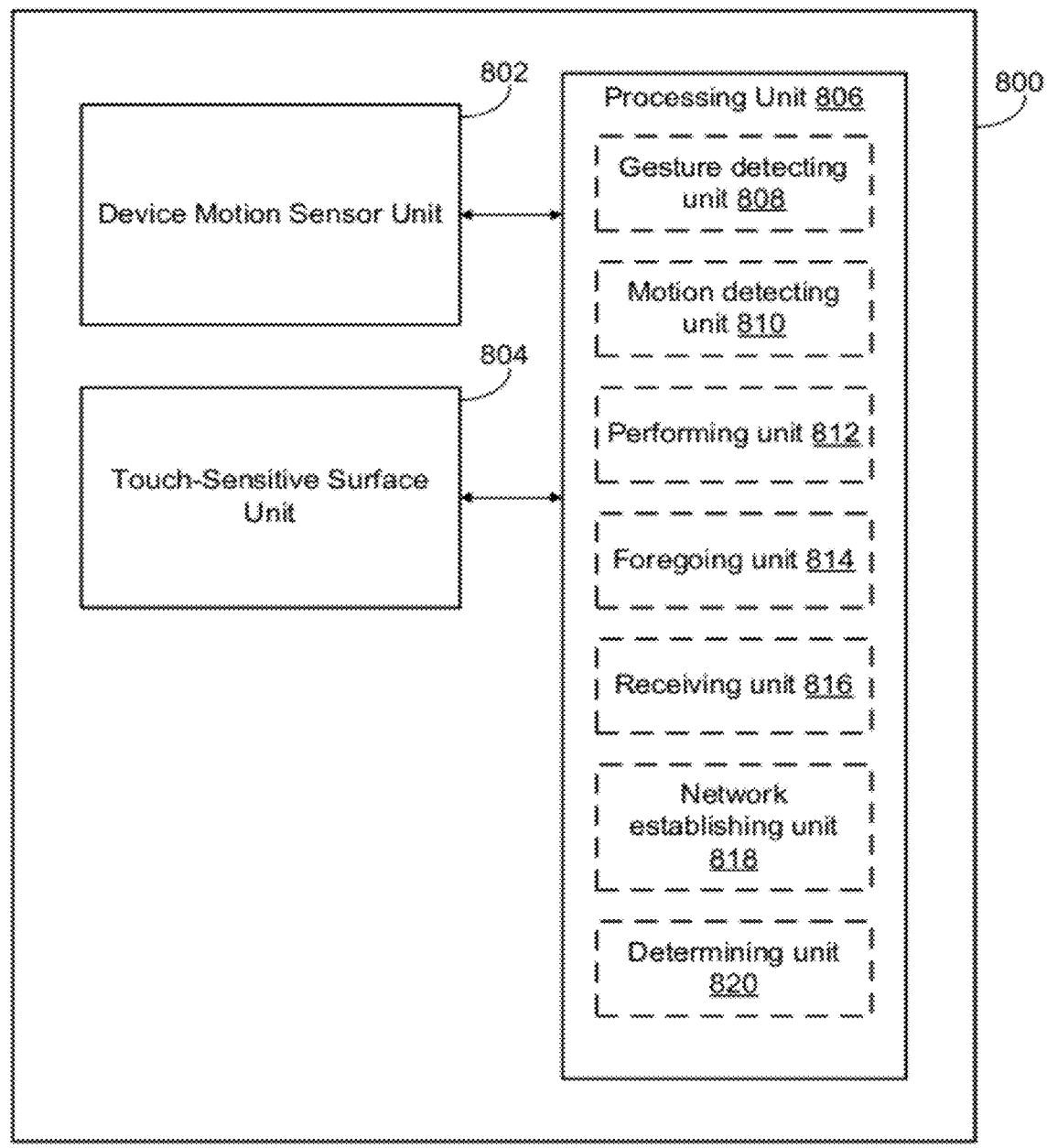
FIG. 8 is a functional block diagram of an electronic device in accordance with some embodiments.

In accordance with some embodiments, FIG. 8 is a functional block diagram of electronic device 800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, an electronic device 800 includes a device motion sensor unit 802 configured to detect motion of the device, a touch-sensitive surface unit 804 configured to receive user gestures, and a processing unit coupled to the device motion sensor unit 802 and the touch-sensitive surface unit 804. In some embodiments, the processing unit 806 includes a gesture detecting unit 808, a motion detecting unit 810, a performing unit 812, a foregoing unit 814, a receiving unit 816, a network establishing unit 818, and a determining unit 820.

The processing unit 806 is configured to detect a predefined gesture on the touch-sensitive surface unit 804 (e.g., using the gesture detecting unit 808). The predefined gesture has one or more gesture components, and a respective gesture component occurs at a respective gesture component time. The processing unit 806 is configured to detect a predefined movement of the electronic device 800 with the device motion sensor unit 802 (e.g., using the motion detecting unit 810). The predefined movement has one or more movement components, and a respective movement component occurs at a respective movement component time. The processing unit 806 is configured to, in response to detecting the predefined gesture and the predefined movement: in accordance with a determination that the one or more gesture components and the one or more movement components satisfy predefined concurrency criteria, perform a predefined operation that is associated with concurrent detection of the predefined gesture and the predefined movement (e.g., using the performing unit 812), and in accordance with a determination that the one or more gesture components and the one or more movement components do not satisfy the predefined concurrency criteria, forego performing the predefined operation (e.g., using the foregoing unit 814).

In some embodiments, the predefined gesture on the touch-sensitive surface unit 804 is a gesture with a duration below a predefined duration threshold.

In some embodiments, the predefined movement of the electronic device 800 is movement of the device 800 that corresponds to an acceleration satisfying a predefined acceleration threshold.

In some embodiments, the predefined gesture includes multiple gesture components and the predefined movement includes a corresponding number of multiple movement components.

In some embodiments, a first gesture component of the predefined gesture is detected at a first gesture time, and a second gesture component of the predefined gesture is detected at a second gesture time (e.g., using the gesture detecting unit 808). A first movement component of the predefined movement is detected at a first movement time, and a second movement component of the predefined movement is detected at a second movement time (e.g., using the motion detecting unit 810). The one or more gesture components and the one or more movement components are determined (e.g., using the determining unit 820) to satisfy the predefined concurrency criteria only if an amount of time between the first gesture time and the first movement time is less than a concurrency threshold, and an amount of time between the second gesture time and the second movement time is less than the concurrency threshold.

In some embodiments, the concurrency threshold is less than 0.1 seconds.

In some embodiments, the predetermined gesture and movement are consistent with inputs that would be detected in response to a hand knocking on the touch-sensitive surface unit 804.

In some embodiments, the predefined operation is a networking operation.

In some embodiments, the predefined operation is a networking operation with other devices within a limited network range of the electronic device 800.

In some embodiments, the processing unit is configured to: receive data indicating that one or more other devices in the limited network range have detected a similar combination of predefined gesture and predefined motion (e.g., using the receiving unit 816), and in response to receiving the data, establish a network connection with the one or more other devices (e.g., using the network establishing unit 818).

Figure 9:
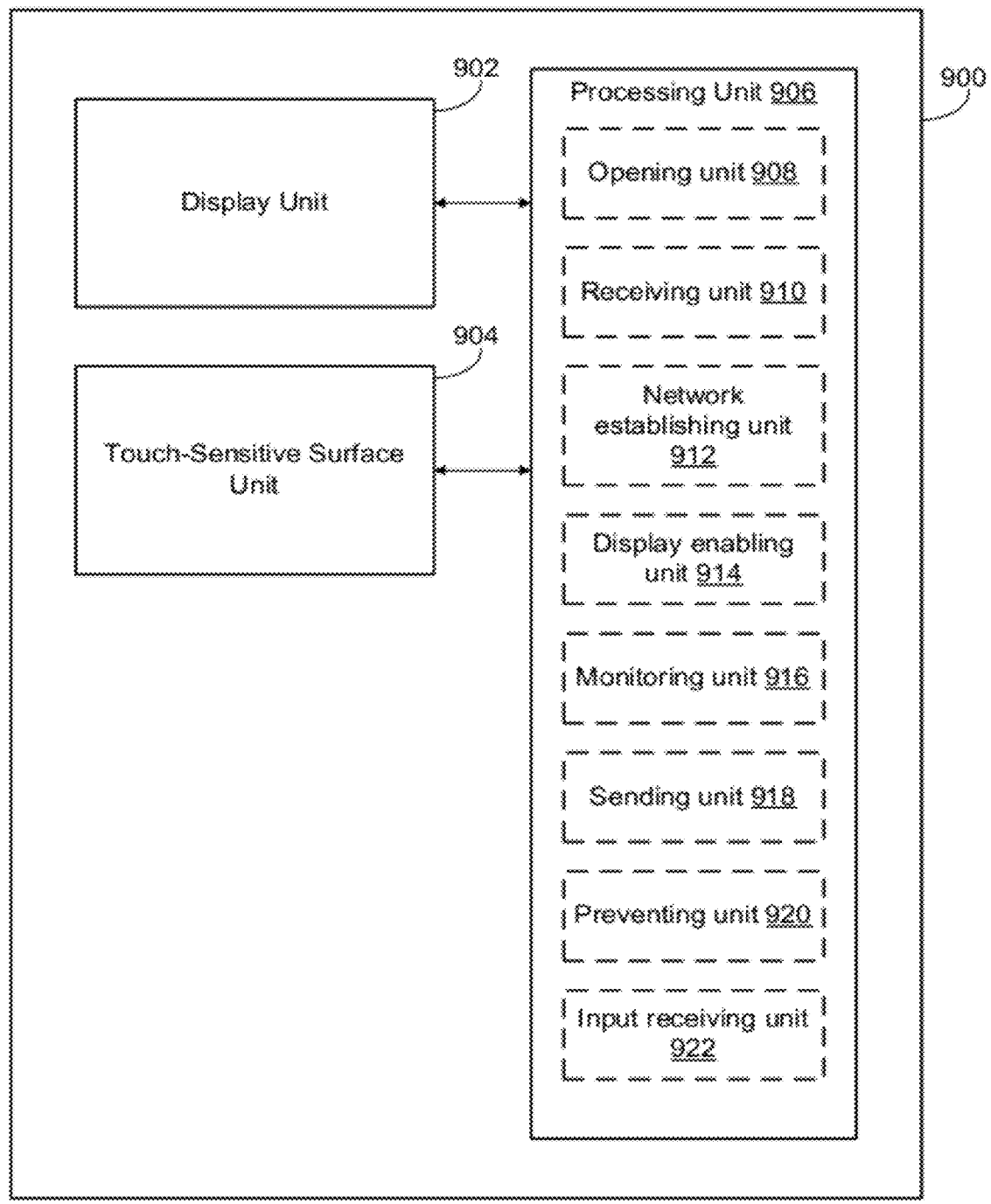
FIG. 9 is a functional block diagram of an electronic device in accordance with some embodiments.

In accordance with some embodiments, FIG. 9 is a functional block diagram of electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, electronic device 900 includes a display unit configured to display a user interface, a touch-sensitive surface unit configured to receive a network-initiation input from a user, and a processing unit coupled to the display unit and the touch-sensitive surface unit. In some embodiments, the processing unit 906 includes an opening unit 908, a receiving unit 910, a network establishing unit 912, a display enabling unit 914, a monitoring unit 916, a sending unit 918, a preventing unit 920, and an input receiving unit 922.

The processing unit 906 is configured to: receive a network-initiation input from a user (e.g., receiving a network-initiation input detected on the touch-sensitive surface unit 904 using the input receiving unit 922), and in response to receiving the network-initiation input from the user, open a network connection time window for establishing one or more network connections with a plurality of candidate devices within a predefined network range of the electronic device (e.g., using the opening unit 908). The network connection time window has a predefined expiration time.

The processing unit 906 is configured to: receive, while the network connection time window is open, one or more respective requests to form a network connection sent from one or more respective responding devices in the plurality of candidate devices within the predefined network range (e.g., using the receiving unit 910), and in response to receiving a respective request from a respective responding device within the predefined network range while the network connection time window is open, establish a respective network connection with the respective responding device (e.g., using the network establishing unit 912).

In some embodiments, the network-initiation input comprises a predefined network-initiation gesture that includes a gesture component detected on the touch-sensitive surface unit 904 of the electronic device 900.

In some embodiments, the network-initiation gesture is not associated with any user interface element displayed on the display unit 902 of the electronic device 900.

In some embodiments, the respective responding device requests to form a network connection in response to detecting a network-response input from a respective user of the respective responding device (e.g., using an input receiving unit of the respective responding device).

In some embodiments, the network-response input is a predefined network-response gesture that includes a gesture component detected on a touch-sensitive surface unit of the respective responding device (e.g., detected using an input receiving unit of the respective responding device).

In some embodiments, the predefined network-response gesture is not associated with any user interface element displayed on a display unit of the respective responding device.

In some embodiments, the network-initiation input is a predefined network-initiation gesture, and the network-response gesture is a same type of gesture as the network-initiation gesture.

In some embodiments, the network-initiation input is a predefined network-initiation gesture, and the network-response gesture is distinct from the network-initiation gesture.

In some embodiments, while the network connection time window is open and prior to detecting the network-response input on a touch-sensitive surface unit of the respective responding device, the respective responding device does not display any visual indication that a network connection may be established with the electronic device (e.g., using the display enabling unit 914 or the preventing unit 920 to prevent the display enabling unit 914 from displaying any visual indication).

In some embodiments, the user interface that was displayed on the display unit of the electronic device prior to receiving the network-initiation input continues to be displayed on the display unit of the electronic device (e.g., using the display enabling unit 914) at least until the respective network connection is established.

In some embodiments, the plurality of candidate devices within the predefined network range includes only devices connected to a same subnet as the electronic device 900.

In some embodiments, the plurality of candidate devices within the predefined network range includes only devices connected to a predefined set of one or more network routers.

In some embodiments, the processing unit 906 is configured to, while the network connection time window is open, monitor the plurality of candidate devices for communications indicating that one or more of the candidate devices have detected a network-response input (e.g., using the monitoring unit 916). Receiving a respective request to form a network connection includes detecting a communication from a respective responding device indicating that the respective responding device has detected a respective network-response input at the respective responding device (e.g., using the receiving unit 910).

In some embodiments, the processing unit 906 is configured to, after receiving the network-initiation input from the user, send an invitation to the plurality of candidate devices (e.g., using the sending unit 918). The invitation has a predefined expiration time. Receiving a respective request to form a network connection includes receiving a respective response to the invitation from a respective responding device prior to the predefined expiration time of the invitation (e.g., using the receiving unit 910). The respective response is generated in response to detecting a respective network-response input at the respective responding device.

In some embodiments, requests to form a network connection are received from two or more respective responding devices of the plurality of candidate devices within the predefined network range (e.g., using the receiving unit 910). Network connections are established between the electronic device and the two or more respective responding devices (e.g., using the network establishing unit 912).

In some embodiments, one of the network connections enables the two or more respective responding devices to communicate with each other (e.g., using the receiving unit 910 and/or the sending unit 918).

In some embodiments, the plurality of candidate devices includes only devices in a predefined group of authorized devices within the predefined network range.

In some embodiments, the plurality of candidate devices includes only devices with a predefined software application.

In some embodiments, the one or more network connections enable the devices to share data between a plurality of different applications on the electronic device and corresponding applications on one or more respective connected responding devices (e.g., using the receiving unit 910 and/or the sending unit 918).

In some embodiments, the one or more network connections are limited to sharing information in a predefined software application that is running on one or more respective connected responding devices (e.g., using the receiving unit 910 and/or the sending unit 918).

In some embodiments, the one or more network connections are used to synchronize content displayed in the predefined software application on the electronic device with content displayed in the predefined software application on one or more respective connected responding devices (e.g., using the receiving unit 910 and/or the sending unit 918).

In some embodiments, the one or more network connections are used to share content that is specific to the predefined software application between the electronic device and one or more respective connected responding devices (e.g., using the receiving unit 910 and/or the sending unit 918).

In some embodiments, the processing unit 906 is configured to, after the predefined expiration time of the network connection time window: receive a request from a respective candidate device of the plurality of candidate devices in the predefined network range to form a network connection with the electronic device (e.g., using the receiving unit 910), and prevent a network connection from being established between the electronic device and the respective candidate device (e.g., using the preventing unit 920).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
receiving a network-initiation input from a user;
in response to receiving the network-initiation input from the user, opening a network connection time window for establishing two or more personal area network connections with a plurality of candidate devices within a predefined network range of the electronic device, the network connection time window having a predefined expiration time;
receiving, while the network connection time window is open, two or more respective requests to form a personal area network connection sent from two or more respective responding devices in the plurality of candidate devices within the predefined network range; and
in response to receiving the two or more respective requests from the two or more respective responding devices within the predefined network range while the network connection time window is open, establishing respective personal area network connections between the electronic device and the two or more respective responding devices,
wherein at least one of the established respective personal area network connections enables the two or more respective responding devices to directly communicate with each other.

2. The device of claim 1, wherein the network-initiation input comprises a predefined network-initiation gesture that includes a gesture component detected on the touch-sensitive surface of the electronic device.

3. The device of claim 2, wherein the network-initiation gesture is not associated with any user interface element displayed on the display of the electronic device.

4. The device of claim 1, wherein a first respective responding device requests to form a personal area network connection in response to detecting a network-response input from a respective user of the first respective responding device.

5. The device of claim 4, wherein the network-response input is a predefined network-response gesture that includes a gesture component detected on a touch-sensitive surface of the first respective responding device.

6. The device of claim 5, wherein the predefined network-response gesture is not associated with any user interface element displayed on a display of the first respective responding device.

7. The device of claim 5, wherein:
the network-initiation input is a predefined network-initiation gesture; and
the network-response gesture is a same type of gesture as the network-initiation gesture.

8. The device of claim 5, wherein:
the network-initiation input is a predefined network-initiation gesture; and
the network-response gesture is distinct from the network-initiation gesture.

9. The device of claim 4, wherein, while the network connection time window is open and prior to detecting the network-response input on a touch-sensitive surface of the first respective responding device, the first respective responding device does not display any visual indication that a personal area network connection may be established with the electronic device.

10. The device of claim 1, wherein a user interface that was displayed on the display of the electronic device prior to receiving the network-initiation input continues to be displayed on the display of the electronic device at least until a first respective personal area network connection is established.

11. The device of claim 1, wherein the plurality of candidate devices within the predefined network range includes only devices connected to a same subnet as the electronic device.

12. The device of claim 1, wherein the plurality of candidate devices within the predefined network range includes only devices connected to a predefined set of one or more network routers.

13. The device of claim 1, including instructions for:
while the network connection time window is open, monitoring the plurality of candidate devices for communications indicating that one or more of the candidate devices have detected a network-response input,
wherein receiving a respective request to form a personal area network connection includes detecting a communication from a respective responding device indicating that the respective responding device has detected a respective network-response input at the respective responding device.

14. The device of claim 1, including instructions for:
after receiving the network-initiation input from the user, sending an invitation to the plurality of candidate devices, wherein the invitation has a predefined expiration time,
wherein receiving a respective request to form a personal area network connection includes receiving a respective response to the invitation from a respective responding device prior to the predefined expiration time of the invitation, wherein the respective response is generated in response to detecting a respective network-response input at the respective responding device.

15. The device of claim 1, wherein the plurality of candidate devices includes only devices in a predefined group of authorized devices within the predefined network range.

16. The device of claim 1, wherein the plurality of candidate devices includes only devices with a predefined software application.

17. The device of claim 1, wherein the two or more personal area network connections enable the sharing of data between a plurality of different applications on the electronic device and corresponding applications on one or more respective connected responding devices.

18. The device of claim 1, wherein the two or more personal area network connections are limited to sharing information in a predefined software application that is running on one or more respective connected responding devices.

19. The device of claim 18, wherein the two or more personal area network connections are used to synchronize content displayed in the predefined software application on the electronic device with content displayed in the predefined software application on one or more respective connected responding devices.

20. The device of claim 18, wherein the two or more personal area network connections are used to share content that is specific to the predefined software application between the electronic device and one or more respective connected responding devices.

21. The device of claim 1, including instructions for, after the predefined expiration time of the network connection time window:
receiving a request from a respective candidate device of the plurality of candidate devices in the predefined network range to form a personal area network connection with the electronic device; and
preventing a personal area network connection from being established between the electronic device and the respective candidate device.

22. A method, comprising:
at an electronic device with a display and a touch-sensitive surface:
receiving a network-initiation input from a user;
in response to receiving the network-initiation input from the user, opening a network connection time window for establishing two or more personal area network connections with a plurality of candidate devices within a predefined network range of the electronic device, the network connection time window having a predefined expiration time;
receiving, while the network connection time window is open, two or more respective requests to form a personal area network connection sent from two or more respective responding devices in the plurality of candidate devices within the predefined network range; and
in response to receiving the two or more respective requests from the two or more respective responding devices within the predefined network range while the network connection time window is open, establishing respective personal area network connections between the electronic device and the two or more respective responding devices,
wherein at least one of the established respective personal area network connections enables the two or more respective responding devices to directly communicate with each other.

23. The method of claim 22, wherein a first respective responding device requests to form a personal area network connection in response to detecting a network-response input from a respective user of the first respective responding device.

24. The method of claim 23, wherein the network-response input is a predefined network-response gesture that includes a gesture component detected on a touch-sensitive surface of the first respective responding device.

25. The method of claim 24, wherein the predefined network-response gesture is not associated with any user interface element displayed on a display of the first respective responding device.

26. The method of claim 24, wherein:
the network-initiation input is a predefined network-initiation gesture; and
the network-response gesture is a same type of gesture as the network-initiation gesture.

27. A non-transitory computer readable storage medium storing one or more programs, the one or more programs comprising instructions, which when executed by an electronic device with a display and a touch-sensitive surface, cause the device to:
receive a network-initiation input from a user;
in response to receiving the network-initiation input from the user, open a network connection time window for establishing two or more personal area network connections with a plurality of candidate devices within a predefined network range of the electronic device, the network connection time window having a predefined expiration time;
receive, while the network connection time window is open, two or more respective requests to form a personal area network connection sent from two or more respective responding devices in the plurality of candidate devices within the predefined network range; and
in response to receiving the two or more respective requests from the two or more respective responding devices within the predefined network range while the network connection time window is open, establish respective personal area network connections between the electronic device and the two or more respective responding devices,
wherein at least one of the established respective personal area network connections enables the two or more respective responding devices to directly communicate with each other.

28. The non-transitory computer readable storage medium of claim 27, wherein a first respective responding device requests to form a personal area network connection in response to detecting a network-response input from a respective user of the first respective responding device.

29. The non-transitory computer readable storage medium of claim 28, wherein the network-response input is a predefined network-response gesture that includes a gesture component detected on a touch-sensitive surface of the first respective responding device.

30. The non-transitory computer readable storage medium of claim 29, wherein the predefined network-response gesture is not associated with any user interface element displayed on a display of the first respective responding device.

31. The non-transitory computer readable storage medium of claim 29, wherein:
the network-initiation input is a predefined network-initiation gesture; and the network-response gesture is a same type of gesture as the network-initiation gesture.

* * * * *